United States Patent
Hansen et al.

(10) Patent No.: US 7,529,789 B2
(45) Date of Patent: May 5, 2009

(54) METHOD FOR REPRESENTING COMPLEX NUMBERS IN A COMMUNICATION SYSTEM

(75) Inventors: Christopher R. Hansen, Grass Valley, CA (US); Felician Bors, Grass Valley, CA (US); Terry C. Brown, Austin, TX (US)

(73) Assignee: Metanoia Technologies, Inc., Austin, TX (US)

( * ) Notice: Subject to any disclaimer, the term of this patent is extended or adjusted under 35 U.S.C. 154(b) by 752 days.

(21) Appl. No.: 10/978,778

(22) Filed: Nov. 1, 2004

(65) Prior Publication Data

US 2006/0095490 A1    May 4, 2006

(51) Int. Cl.
*G06F 17/14* (2006.01)
(52) U.S. Cl. .................................. 708/403; 708/409
(58) Field of Classification Search .............. 708/400, 708/403–409
See application file for complete search history.

(56) References Cited

U.S. PATENT DOCUMENTS

| | | | | |
|---|---|---|---|---|
| 6,247,034 B1* | 6/2001 | Nakai et al. | ................. | 708/409 |
| 6,366,936 B1* | 4/2002 | Lee et al. | .................... | 708/404 |
| 2005/0131976 A1* | 6/2005 | Sunwoo | ...................... | 708/404 |
| 2005/0160127 A1* | 7/2005 | Swartzlander et al. | ...... | 708/404 |
| 2006/0075010 A1* | 4/2006 | Wadleigh et al. | ............ | 708/404 |

\* cited by examiner

*Primary Examiner*—Tan V Mai
(74) *Attorney, Agent, or Firm*—Lee & Hayes, PLLC; Margaret Anderson; Emmanuel Rivera

(57) ABSTRACT

A method for storage for complex numbers that employs a shared exponent field is disclosed. Rather than each floating point component of an complex number having its own distinct signed mantissa and exponent fields, each component includes a distinct signed mantissa field and shares an exponent field, thereby increasing the possible size of each distinct signed mantissa field by as much as one half the number of bits formerly employed to store a single distinct exponent field.

6 Claims, 15 Drawing Sheets

Pipeline Schedule

| 1 clock per row | RAM Read Access 1202 | Stage 1 Calculations 1204 | Stage 1 Storage 1206 | Stage 2 Calculations 1208 |
|---|---|---|---|---|
| | X0,X4 | a0,a4 | | |
| | X2,X6 | a2,a6 | a0,a4 | |
| | X3,X7 | a3,a7 | a0,a4, a2,a6 | b0,b2 |
| | X1,X5 | a1,a5 | a3,a4, a7,a6 | b4,b6 |
| | X0,X4 | a0,a4 | a3,a1, a7,a5 | b1,b3 |
| | X2,X6 | a2,a6 | a0,a4, a7,a5 | b5,b7 |
| | X3,X7 | a3,a7 | a0,a4, a2,a6 | b0,b2 |
| | X1,X5 | a1,a5 | a3,a4, a7,a6 | b4,b6 |
| | X0,X4 | a0,a4 | a3,a1, a7,a5 | b1,b3 |
| | X2,X6 | a2,a6 | a0,a4, a7,a5 | b5,b7 |
| | X3,X7 | a3,a7 | a0,a4, a2,a6 | b0,b2 |
| | X1,X5 | a1,a5 | a3,a4, a7,a6 | b4,b6 |
| | | | a3,a1, a7,a5 | b1,b3 |
| | | | | b5,b7 |
| | | | | |
| | | | | |
| | | | | |

Pipeline Schedule 1 clock per row

| Stage 2 Calculations 1208 | Stage 2 Storage 1210 | Stage 3 Calculations 1212 | RAM Write Access 1214 |
|---|---|---|---|
|  |  |  |  |
|  |  |  |  |
| b0,b2 |  |  |  |
| b4,b6 | b0,b2 |  |  |
| b1,b3 | b0,b2,b4,b6 |  |  |
| b5,b7 | b0,b2,b4,b6, b1,b3 | c0,c4 |  |
| b0,b2 | b0,b2,b4,b6 b1,b3,b7,b5 | c2,c6 | X0,X4 |
| b4,b6 | b0,b2, b4,b6 b1,b3,b7,b5 | c3,c7 | X2,X6 |
| b1,b3 | b0,b2, b4,b6 b4,b6, b7,b5 | c1,c5 | X3,X7 |
| b5,b7 | b0,b2,b1,b3 b4,b6, b7,b5 | c0,c4 | X1,X5 |
| b0,b2 | b0,b2,b1,b3 b4,b6,b7,b5 | c2,c6 | X0,X4 |
| b4,b6 | b0,b2,b1,b3 b4,b6,b7,b5 | c3,c7 | X2,X6 |
| b1,b3 | b0,b2,b4,b6 b4,b6,b7,b5 | c1,c5 | X3,X7 |
| b5,b7 | b0,b2,b4,b6 b1,b3,b7,b5 | c0,c4 | X1,X5 |
|  | b0,b2,b4,b6 b1,b3,b7,b5 | c2,c6 | X0,X4 |
|  |  | c3,c7 | X2,X6 |
|  |  | c1,c5 | X3,X7 |
|  |  |  | X1,X5 |

METHOD FOR REPRESENTING COMPLEX NUMBERS IN A COMMUNICATION SYSTEM

TECHNICAL FIELD OF THE DISCLOSURE

This invention pertains to computer calculations involving complex numbers and, more specifically, to a novel method of allocating space in registers for floating point representations of complex numbers.

BACKGROUND OF THE DISCLOSURE

One of the fundamental issues in computer science computation is the representation of numbers, specifically integers, real numbers and complex numbers. Although there are bit lengths that can easily accommodate the result of most integer and real number computations, problems arise when a required bit length is fixed or predetermined and the computation includes the manipulation and storage of complex numbers. The primary reason for this is that complex numbers include two (2) components, or a "real" and an "imaginary" component.

Each component is typically represented as a floating point number, which comprises three fields: a sign, a significand, or "mantissa," and an exponent. The sign field represents whether the corresponding number is positive or negative. According to IEEE standard 754 for floating point numbers, the mantissa field is defined as an explicit or implicit leading bit to the left of the number's implied binary point and a fraction field to its right. The exponent field represents the power to which a base number must be raised to generate the represented number.

If sixteen (16) bits are reserved for each of the real and imaginary components of a complex number, typically, one (1) bit is employed for the sign, either two (2) or four (4) bits are employed for the exponent, and the remaining thirteen (13) or eleven (11) bits, respectively, are employed for the mantissa.

A method is needed for the storage of complex numbers in a computing or communication system. One such communication system that deals with complex numbers includes digital subscriber line type systems. The ADSL and VDSL are exemplary types of digital subscriber communication systems. The VDSL standard as provided by the ANSI T1E1.4 Technical Subcommittee, provides guidelines for the transmitter and receiver within the VDSL modem. Very high bit rate DSL (VDSL) is currently capable of providing speeds of 52 Mbps downstream and 16 Mbps upstream. ADSL is capable of 10 Mbps downstream and 800 Kbps upstream. Other standards beyond ADSL and VDSL are being considered by standards bodies. For example, VDSL2 is one such standard. To implement these current and upcoming standards, a discrete multitone (DMT) transceiver is required that can operate at higher bit rates efficiently. A method for dealing with complex numbers that allows digital subscriber line technologies to be efficient enhances the value of such technologies by reducing equipment size and maximizing communication throughput. These and other advantages of the invention, as well as additional inventive features, will be apparent from the description of the invention provided herein.

SUMMARY OF THE INVENTION

The invention provides a method of storage for complex numbers that employs shared bit fields. As mentioned above, complex numbers have real and imaginary components, each of which is represented by a floating point number, which has sign, significand and exponent fields. If, for the sake of an example, a floating point is stored in a sixteen (16) bit memory space, typically one (1) bit is reserved for the sign, eleven (11) bits are reserved for the significand and a four (4) bit field remains for the storage of the exponent. For the purposes of this Specification, the sign field and the significand fields are combined and referred to simply as a "signed mantissa." Of course, as explained above, a complex number contains two (2) floating point numbers so a complex number is typically thirty-two (32) bits in length, or sixteen (16) bits for each of two floating point numbers.

In the disclosed implementation, rather than each floating point component of a complex number having its own distinct signed mantissa and exponent fields, each component only includes distinct sign and significand fields and a single exponent field is shared by the two components. If a four (4) bit exponent field is shared by the real and imaginary components of a complex number, then each component is able to include fourteen (14) bits rather than twelve (12) bits to store the signed mantissa. This two (2) bit advantage greatly increases the level of precision corresponding to the relevant floating point numbers and thus the system in which they are employed.

An embodiment is directed to a Fourier transform architecture for use in a communication system that includes a memory that stores complex numbers employing shared bit fields.

The example described above is not intended to limit the claimed subject matter. The techniques provided work in a wide variety of numerical configurations and memory storage schemes.

This summary is not intended as a comprehensive description of the claimed subject matter but, rather, is intended to provide a brief overview of some of the functionality associated therewith. Other systems, methods, functionality, features and advantages of the invention will be or will become apparent to one with skill in the art upon examination of the following figures and detailed description.

BRIEF DESCRIPTION OF THE DRAWINGS

For a more complete understanding of the present disclosure, and the advantages thereof, reference is now made to the following brief descriptions taken in conjunction with the accompanying drawings, in which like reference numerals indicate like features.

FIGS. 12A and 12B is a table illustrating a plurality of banks for holding partial products during different stages of FFT and IFFT processing in accordance with an embodiment of the present invention.

DETAILED DESCRIPTION

Figure 1:
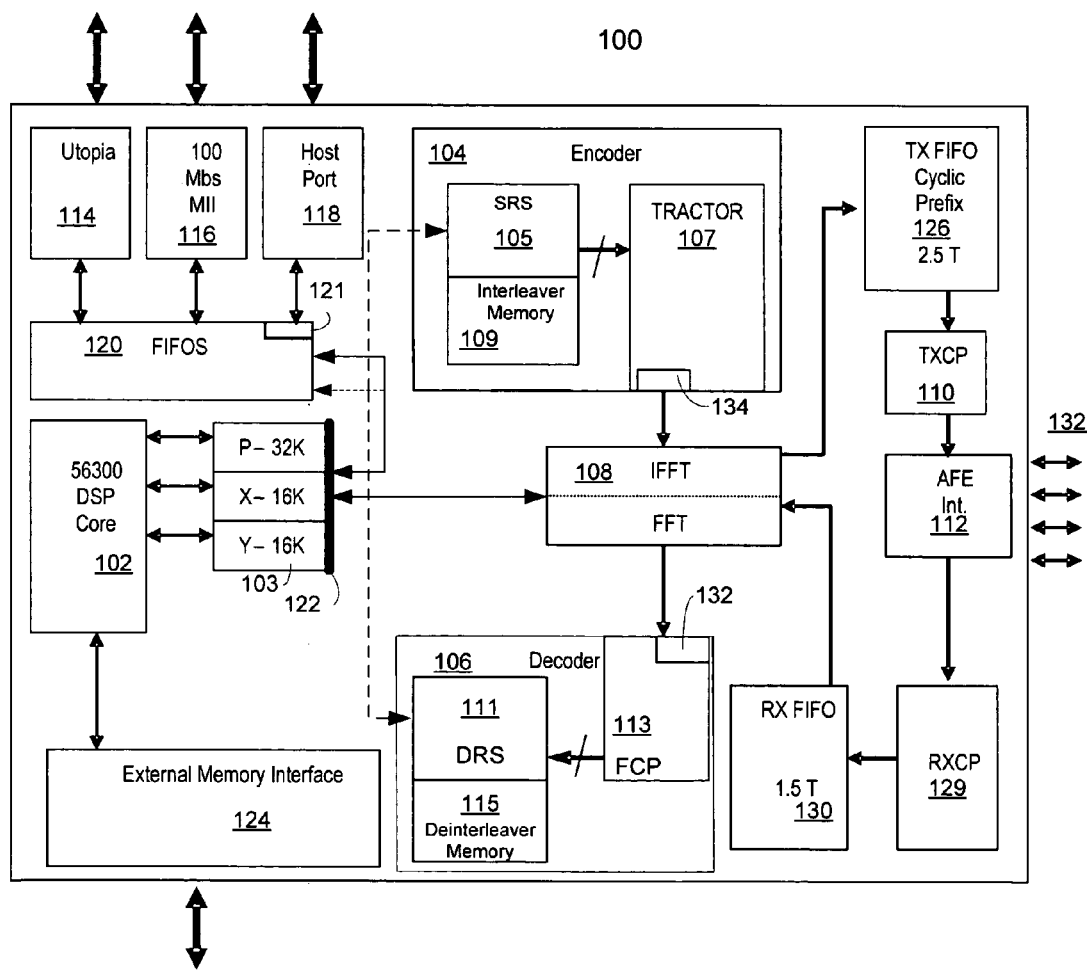
FIG. 1 is a block diagram of an application specific integrated circuit (ASIC) configured as a VDSL/ADSL communication engine in accordance with an embodiment of the present invention.

In order to facilitate an understanding of the present invention a glossary of terms used in the description of the present invention is provided below:
ADSL: Asynchronous Digital Subscriber Line
AFE: Analog Front End
AGU: Address Generation Unit
CRC: Cyclic Redundancy Code
DFT: Discrete Fourier Transform
DMA: Direct Memory Access
DMT: Discrete Multi Tone
DRS: De-interleaver/Reed-Solomon decoder and descrambler
DSP: Digital Signal Processor
FCP: FEQ Slicer
FEQ: Frequency Domain Equalizer
FIFO: First In/First Out Memory
FIR: Finite Impulse Response
FFT: Fast Fourier Transform
IFFT: Inverse Fast Fourier Transform
RXCP: Time Domain Receive Co-Processor
Showtime: Operations involving transfer of data
SRS: Framer/Scrambler/Reed-Solomon Encoder
TEQ: Time Domain Equalizer
TRACTOR: Trellis and Constellation Encoder/Bit and Tone Ordering component.
TXCP: Time Domain Transmit Co-Processor.
VDSL: Very high bit-rate Digital Subscriber Line
VOC: VDSL overhead control channel The multicarrier engine 100 shown in FIG. 1 illustrates an area and power efficient architecture for multicarrier communication. Engine 100 includes a single DSP core 102 that interacts with multiple hardware coprocessor blocks to enable core 102 to perform higher level functions and control and allow the multiple hardware blocks to perform DMT calculations and data movement.

Engine 100 includes a DSP core 102 that can be implemented with a core compatible with a Motorola 56300 DSP with an X, Y, and P memory space 103. In an embodiment, all of the memory required for VDSL or four channel ADSL operations are provided within engine 100. In other embodiments, external memory can be added to engine 100 to support advanced features.

Engine 100 includes hardware co-processors, including encoder 104, decoder 106, FFT/IFFT coprocessor 108, TXCP coprocessor 110, RXCP 129 and an AFE interface control processor 112. Co-processors 104, 106, 108, 110, 112 and 129 perform all DMT operations from framing to cyclic extension and are configured to handle current and future DSL configurations independent of significant attention from core 102.

Engine 100 interfaces with a computer or network via one of three ports, 114, 116 and 118, shown as Utopia 114, 100 Mbs MII 116 and host port 118. Each of ports 114, 116 and 118 interface with FIFOs 120 and 121. FIFOs 120 and 121 are coupled to encoder 104 and DMA 122. FIFO 120 can be implemented as a shared FIFO between ports 114 and 116 because only one of the ports 114 and 116 is active at a time. FIFO 121 can be implemented as a dedicated host port FIFO and can operate with ports 114 and 116 or alone. Ports 114 and 116 can also be configured to share logic and the like. DMA 122 and core 102 can also interact with an external memory interface 124 to support adding external memory to engine 100 for advanced features. The local memory installed within each hardware block 104, 106, 110 and 112 and DMA 122 is coupled via point-to-point buses to IFFT/FFT 108 to send and receive data. Encoder 104 is coupled to receive data from FIFOs 120 and provide encoded data to IFFT/FFT coprocessor 108. Encoder 104 is configured to include a framer/scrambler/Reed-Solomon encoder component (SRS) 105, which is coupled to a trellis and constellation encoder/bit extracting/tone ordering (TRACTOR) 107. SRS 105 is also coupled to interleaver memory 109. Additional encoder 104 components are further shown and described below with reference to FIG. 3.

IFFT/FFT 108 is coupled for transmitting cyclic prefixes to FIFO 126, and to transmit time domain co-processor TXCP 110 and AFE 112. AFE 112 operates to both receive and transmit via interface 132. For the receive path, AFE 112 receives data via interface 132, provides the data to TEQ/RXCP 128/129, which passes the data to receive FIFO 130 and through to IFFT/FFT 108. IFFT/FFT 108 runs either an inverse or forward transform, depending on whether engine 100 is transmitting or receiving.

According to an embodiment, IFFT/FFT 108 can be used as the central timer for engine 100. Alternatively, the IFFT/FFT 108 in combination with RXCP 129 can operate to provide timing for engine 100. RXCP 129 can implement both an auto mode and a manual mode, each mode limited by the amount of time required to run transforms in IFFT/FFT 108. IFFT/FFT 108 has the most critical timing issues in the system and is configured to use FFT processing time markers to setup hardware blocks for a next symbol. More specifically, IFFT/FFT 108 uses approximately one half of a symbol period to process a FFT or IFFT. The end of FFT processing marks the beginning of the next sample period. At this time, according to one embodiment, an option is to allow all hardware blocks to be idle except for the continuous time domain blocks (FIFOs 120, TXCP 110, and AFE interface 112). Core 102 could use this time marker to setup hardware blocks for the next symbol. IFFT/FFT 108 provides start symbols to encoder 104 and decoder 106.

In alternate embodiments, hardware blocks can be configured to run as directed by either an auto mode or a manual trigger and generate an interrupt on completion. Thus, for example, core 102 can operate to receive an interrupt identifying a hardware block as having completed a function and generate a request for another hardware block. A hardware block can also run via an auto-mode request received by another hardware block over a point-to-point bus, for example. Each hardware block can perform different functions according to the trigger or request received. The frequency domain components, such as IFFT/FFT 109 and FCP 113 perform according to received requests. In the embodiment, frequency domain components can be configured to perform operations during about 90% of a symbol period.

Decoder 106 receives a signal to begin processing as soon as the FFT output has been written to a decoder 106 input FIFO 132. Conversely, RX FIFO 130 triggers encoder 104 when a programmable threshold mark is reached in FIFO 134. Then, encoder 104 triggers IFFT/FFT 108 when data is available. Optionally, engine 100 controls timing directly and hardware timing signals are ignored in such a case. In either case, however, encoder 104 and decoder 106 each have almost a full symbol period in which to perform their calculations. Decoder 106 is shown including de-interleaver/Reed-Solomon decoder and descrambler (DRS) 111, which receives data from FEQ slicer/FCP 113. Like encoder 104, DRS 111 is coupled to de-interleaver memory 115.

Figure 2:
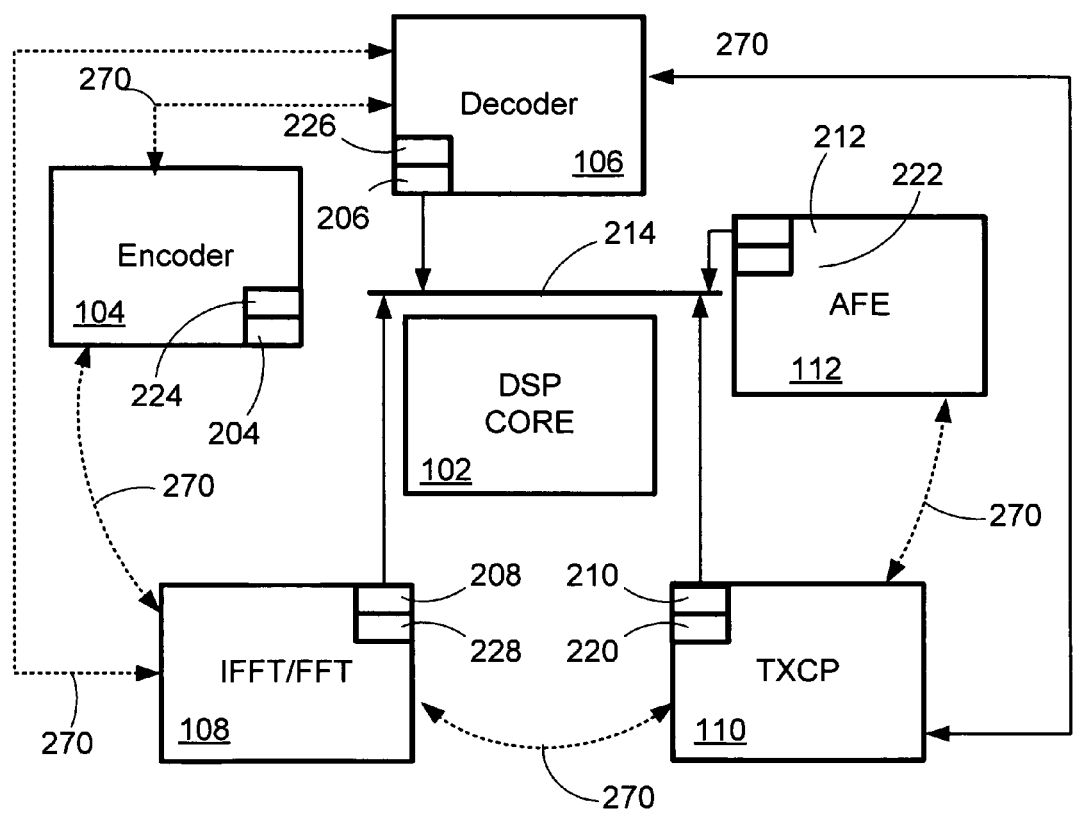
FIG. 2 is an enhanced block diagram of portions the ASIC shown in FIG. 1 in accordance with an embodiment of the present invention.

Referring to FIG. 2, co-processors 104, 106, 108, 110 and 112 each include a set of registers 204, 206, 208, 210 and 212 mapped in the X or Y peripheral address space for core 102. A peripheral bus interface 214 is used for transferring control information between core 102 and co-processors 104, 106, 108, 110 and 112. Local memories 224, 226, 228, 230, 232 and 234 within each co-processor are also indirectly mapped into a peripheral address space via a memory port, which can be implemented as a set of registers including address and data registers and a state machine. Specifically, in an embodiment, data is written to the address and data registers of the memory port. Core 102 writes to the address register first, the other side of the address register is coupled to the address bus of a memory. Core 102 can then write to the data register and the data is written to the memory associated with the register. In one embodiment, the mapping gives core 102 the ability to setup DMA transfers of data to and from distributed memories in co-processors 104, 106, 108, 110 and 112. In one embodiment, the address register has an auto-update mode. More specifically, a number of modes can be provided for auto-update, such as increment, increment by two, decrement, decrement by two, and decrement or increment per specific block. As will be appreciated by those of skill in the art with the benefit of this disclosure, an auto-mode can implement one or several of the increment and decrement modes according to system requirements.

Due to the high bandwidth requirements at various stages of the transmitter and receiver, core 102 is not used for data movement. Rather, each hardware block 104, 106, 108, 110 and 112 transfers data to the next under DSP control. In an embodiment, each transfer can be configured to be self-managing, controlled by core 102 initialized parameters. In the embodiment, hardware flags synchronize timing between processes.

As shown in FIG. 2, data transfers can occur on dedicated point-to-point buses 270, shown between each hardware block 104, 106, 108, 110 and 112 and each next logical block in a path. Because buses 270 are point-to-point, they are much simpler than those used for the bi-directional peripheral and DMA buses. Point-to-point buses 270 are designed to efficiently support the dataflow requirements for data transmit and receive (hereinafter referred to as "Showtime") operation. In one embodiment, point-to-point buses 270 are configurable to enable the different requirements during training of engine 100. Each hardware block can perform a pass-through from input to output on point-to-point buses 270 allowing the point-to-point buses to form a ring structure.

Point-to-point buses 270 can include five sets of signals: target channel, data bus, transfer request, transfer active, and a target ready. Each hardware module 104, 106, 108, 110 and 112 in the transmit and receive paths has a point-to-point connection to the next logical module in the path. A simple handshake is used to transfer data on the buses. When a module is ready to transfer data on the bus it puts the target address on the address bus, the data on the data bus, and asserts the transfer request. The next module in the chain indicates that it is ready to accept data on the bus by asserting the ready signal. A data transfer occurs on every cycle in which the transfer request and ready signals are asserted. The transfer active signal is used to frame a block transfer of data. Either the transmitter or receiver can throttle the block transfer using the handshake signals. Importantly, according to an embodiment, the handshake procedure is completed independent of round trip timing between receiver and transmitter. Thus, most of a clock cycle becomes available for transfer of data and control signals between hardware blocks. The timing is therefore localized thereby reducing routing issues for deep submicron implementation.

The hardware co-processor blocks can be triggered to begin performing calculations by core 102 or by a signal from another hardware block.

Transmit Path Operation

Figure 3:
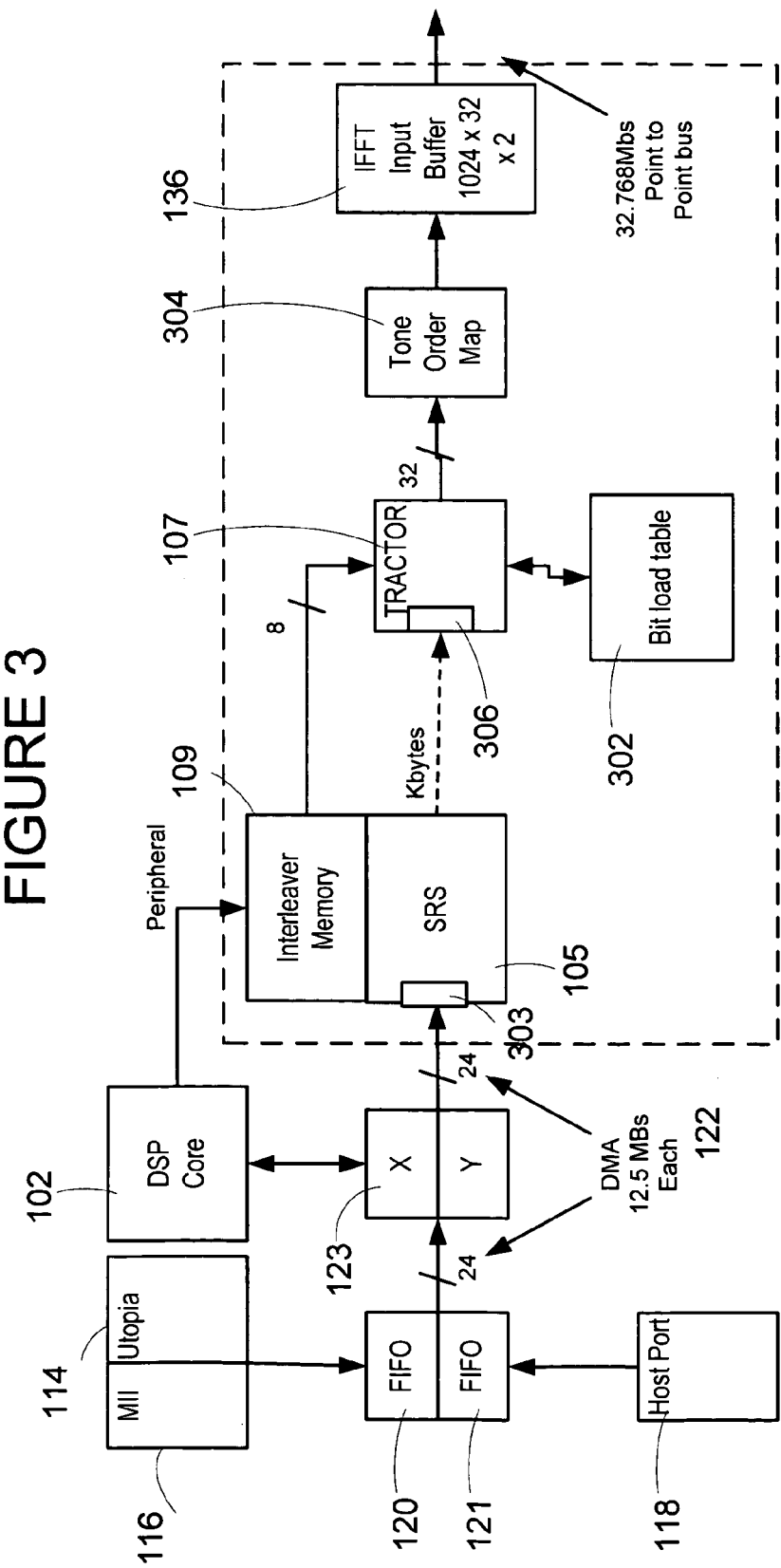
FIG. 3 is a block diagram illustrating a transmit path in accordance with an embodiment of the present invention

Referring now to FIG. 3 in combination with FIG. 1, transmit path operation is now described. The data to be transmitted to a remote modem arrives on the Utopia 114, MII 116, or host Port 118 interfaces and is deposited into either FIFO 120 or 121. Because Utopia 114 and Ethernet interfaces such as MII 116 do not generally require simultaneous operation, a single input FIFO 120 is shared by both interfaces 114 and 116. Host port 118 does not share a FIFO with these interfaces because it can possibly be required to enable communication between two engine 100s during Showtime. Thus, an embodiment provides that host port 118 has a separate smaller FIFO 121. DMA controller 122 transfers FIFO data to X or Y data memory 123 for use by core 102 or directly to encoder 104. In one embodiment, Utopia 114 and 100 Mbs MII 116 share large FIFOs, such as 4 K bytes per channel for 16 K bytes total bytes. Host port 118 can be configured to interface with a small 24 byte FIFO 121. FIFO 121 can be used to shield block data from DMA latency and provide higher DMA performance. In one embodiment, FIFO 121 is configured to perform data conversions, including bit swapping, byte swapping, byte packing and the like.

The transfers of FIFO data and the subsequent processing only occur during Showtime operation. In an embodiment, the maximum data rate in the transmit direction is 120 Mbs. After core 102 receives data in memory, the data is available for processing or can be sent to encoder 104 via DMA 122. In one embodiment, core 102 memory is used to provide additional flexibility and buffering. Since the data can also be DMA transferred directly to encoder 104 from a FIFO 120, 121, an embodiment provides for enabling sufficient space in the relevant FIFO to hold one sample period of input data. When multiple channels are employed, FIFO space can be divided evenly among the channels.

In FIG. 3, encoder 104 is shown configured to perform framing, CRC generation, scrambling, interleaving, which are performed in SRS 105, as well as bit extraction, constellation encoding, and tone ordering in TRACTOR 107. Encoder 104 is shown in FIG. 3 as including SRS 105, a 32 Kbyte interleave buffer 109, TRACTOR 107, which is coupled to both interleave buffer 109 and SRS 105. TRAC- TOR 107 is shown coupled to bit load table 302 and to tone order map 304. Tone order map 304 is coupled to IFFT input buffer 134.

Encoder 104 functions are divided between SRS 105 and TRACTOR 107 modules. In an embodiment, encoder 104 is configured independent of fixed logic that would be required for these operations. Instead, SRS 105 and TRACTOR 107 are designed to be reasonably generic and programmable by core 102. Thus, encoder 104 can be altered for future specification changes. Further, hardware components therein can be reused for training and other non-Showtime functions.

Regarding the functionality within encoder 104, SRS 105 fetches data from core 102 memory or directly from FIFO 120 via DMA 122 and performs framing, CRC generation, scrambling, and Reed-Solomon encoding. Next, SRS transmits the data in the interleave memory. These functions can be performed serially, thus, SRS 105 has minimal local storage requirements. Four small input FIFOs are used to buffer the incoming DMA transfers. The four FIFOs are provided to support the four basic types of input data: fast mode payload, fast mode overhead, interleaved mode payload, and interleaved mode overhead. In one embodiment, FIFO 121 can be configured to be located within encoder 104 rather than as a separate entity. Thus, depending on system requirements, FIFO 121 can be configured to be duplicated or replaced with a FIFO 121 in SRS 105, DRS 111, Host Port 118, and/or coupled to MII 116 interface and Utopia 114 interface.

SRS 105 issues a DMA request when one of the input FIFOs reaches a low water mark. When SRS 105 is ready to process a new frame of data, core 102 configures the block with all framing parameters, DMA parameters, and other controls and then starts the SRS 105. From that point, SRS 105 operates independent of core 102 and fetches data from memory as needed. SRS 105 processes approximately one byte per system clock cycle. Thus, the only significant latency produced by SRS 105 is the latency produced by the interleaver function.

SRS 105 manages interleave memory 109 completely. More specifically, SRS 105 writes and reads samples using interleave memory 109 and provides them through a small FIFO to TRACTOR 107. Interleave memory 109 is designed as a byte wide memory to simplify access for complex interleaver addressing modes. In the worst case, the bandwidth into and out of the buffer is a total of 25 MBs. Since core 102 has higher memory requirements for Training than Showtime and the interleaver is not active during Training, the 32 KB of interleave memory 109 is available for use by core 102. Memory 109 can be accessed through the memory port of the SRS. Memory 109 appears as an 8K×32 memory block to core 102.

TRACTOR 107 receives interleaved and non-interleaved data from SRS 105 and performs bit extraction, rotation, constellation encoding (with or without trellis), and tone ordering. TRACTOR 107 also includes circuitry for generating training symbols such as O/R-P-TRAINING, O/R-P-SYNCHRO, and O/R-P-MEDLEY as provided in the VDSL and ADSL specifications, as is known. In one embodiment, TRACTOR 107 includes a pseudo-random number generator and constellation rotator to assist in generating training symbols.

Processing in TRACTOR 107 occurs in bit order by first performing bit extraction and rotation and then performing constellation encoding. TRACTOR 107 performs tone ordering by writing to different locations in output memory. IFFT/FFT 108 sequentially receives data from TRACTOR 107 output memory. Thus, IFFT portion of IFFT/FFT 108 receives tone ordered data.

SRS 105 sends bytes to TRACTOR 107. These bytes are received in TRACTOR input buffer 306. TRACTOR input buffer 306 receives bytes and organizes the data into 16 or 32 bit words. TRACTOR input buffer 306 also serves to maintain data flow by preventing the different timing requirements of TRACTOR 107 and SRS 105 from causing excessive stalls.

In one embodiment, TRACTOR 107 processes low bit count constellations from the TRACTOR input buffer 306 before processing high bit count constellations from interleave memory 109. Core 102 writes to bit load table 302 in tone order. The tables can be rearranged by core 102 in tone or bit order to enable a simplified or tone order configuration. TRACTOR input buffer 306 data passes to the constellation encoder. Depending on the path input to TRACTOR input buffer 306, the processing of TRACTOR input buffer 306 will be dominated by the speed of the constellation encoder. Initially, the data with the fewest bits is sent first and TRACTOR 107 extracts multiple constellations from a byte of data. As constellation sizes grow, the SRS 105 operations adjust accordingly. For one path, when the higher bit loaded constellations of interleave memory 109 are processed, the processing time will be dominated by SRS speed. For the worst cases, TRACTOR input buffer 306 stalls will not dominate the processing because of the larger constellation size. In all cases, the delay through SRS 105 and TRACTOR 107 will be much less than a symbol period.

In multi-channel ADSL mode, SRS 105 and TRACTOR 107 functions must be shared between up to four channels. Each of SRS 105 and TRACTOR 107 completes an entire symbol of processing for one channel before moving to the next. In one embodiment, memory and other resources available for supporting VDSL are enough to support four ADSL channels with the exception of interleave memory 109. ADSL channels can use more than the available 32 Kbytes of memory requiring external memory or core 102 memory to be used for the interleave function. After constellation encoding, TRACTOR 107 performs tone re-ordering and deposits the constellation points into TRACTOR output buffer 134.

IFFT Functionality for Transmit

Figure 4:
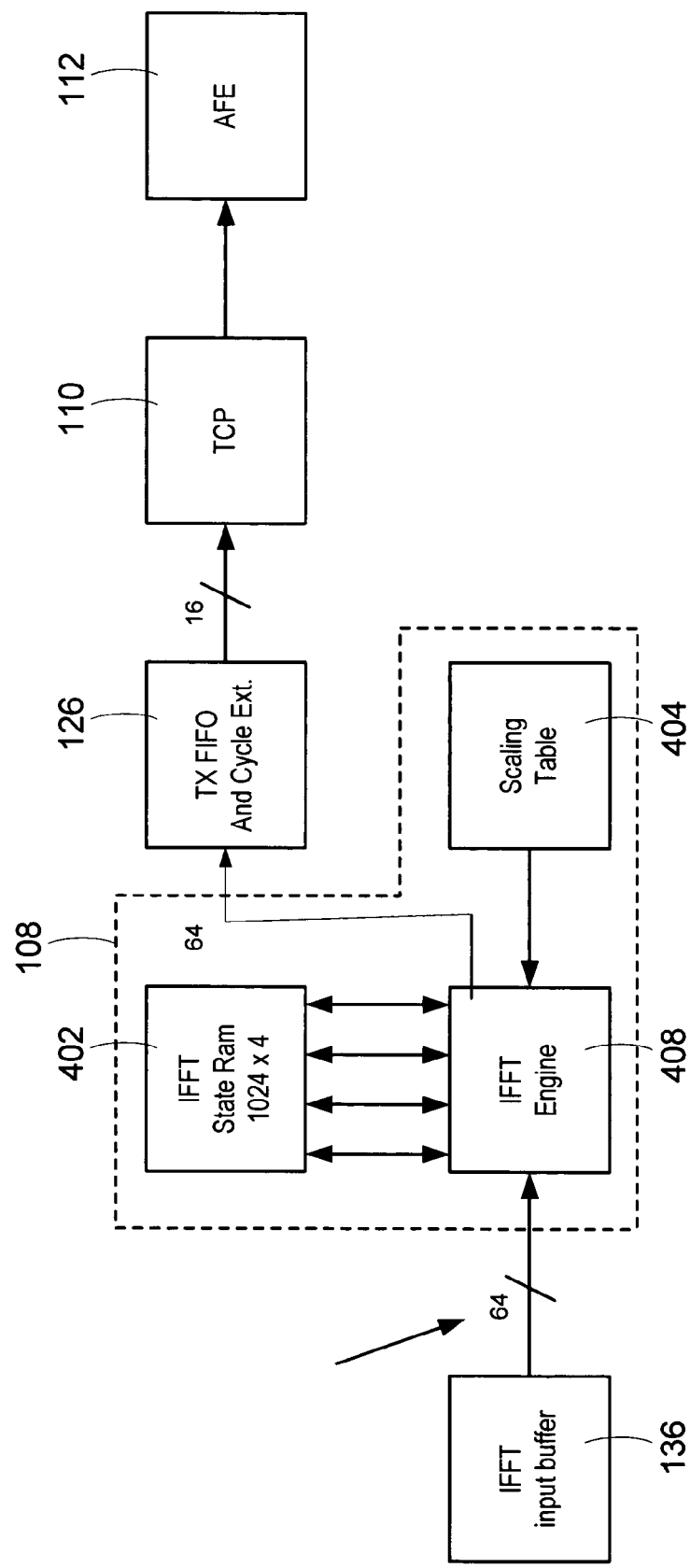
FIG. 4 is a block diagram illustrating IFFT/FFT functionality interactions for a signal transmit path in accordance with an embodiment of the present invention.

Referring now to FIG. 4, a block diagram illustrates IFFT/FFT 108 functionality interactions for the transmit path. Specifically, TRACTOR output buffer 134 is coupled to transmit up to 1024 pairs of complex tones in 64 bits to IFFT engine 108 at a rate of about 64 bits per system clock to IFFT/FFT engine 108. From IFFT/FFT engine 108, data is transferred to and from FFT state ram 402. Scaling table 404 is shown to store values such that each bin can be multiplied in the frequency domain, such that power is best allocated among the bins.

IFFT/FFT 108 operates on 4096 tones and copies data via point-to-point transfers from TRACTOR output buffer 134 into the correct transmit locations in internal memory based on a transmit and receive frequency map associated with the point-to-point transfers. IFFT/FFT 108 performs pre-scaling on the transmit tones during this transfer. In one embodiment, zeroing is accomplished by clearing all memory before an input transfer; writing to each of four banks at once; and clearing a state RAM in a number of clock cycles. The number of clock cycles can be 1024 or as system requirements dictate.

The output of IFFT/FFT 108 is transferred to transmit FIFO 126 at a bursting rate of about four 16-bit samples per clock. A 64 bit dedicated bus is used to limit the amount of FFT 108 processing time that is consumed by the transfer. Transmit FIFO 126 can be implemented as a single port RAM and the AFE interface 112 can require access to it once for every four AFE clocks. For the case where the system clock is four times the AFE clock the AFE interface will require a FIFO access once every $16^{th}$ system clock. In such a system, an IFFT output transfer can be configured to use 2176 clocks. The AFE 112 side of FIFO 126 requires a new sample every 16 system clocks because four samples are read from the FIFO per system clock and the system clock frequency can be implemented to be, for example, four times the sample clock. In other embodiments the engine 100 can be configured to be independent of an AFE 112 sample clock.

In the case of multiple ADSL channels, FIFO 126 is logically partitioned into multiple FIFOs with individual input/output pointers. The multiple FIFOs allow FFT coprocessor 108 to fill FIFO 126 in the same manner as VDSL. The AFE 112 side of FIFO 126 can read the data out from alternate channels on each system clock and send the data to the appropriate off chip AFE 112. More specifically, AFE 112 can be configured to include a small, such as a four sample size FIFO on each channel. When an AFE 112 clock occurs for a channel, the channel can be considered as making a request for data. When a sample is requested from receive FIFO 130, that channel can be considered as having a request serviced. The channel with the highest number of outstanding requests is the next to request data from FIFO 130.

Transmit FIFO 126 contains hardware for performing cyclic prefix calculations. The cyclic prefix parameters (CE, CS, CP, and Beta) are fully configurable by core 102. According to an embodiment, 2048 transfers occur for 8192 samples. IFFT/FFT 108 bursts an additional prefix extension making the size of the transfer depend on the cyclic extension size. Any size that is a multiple of four that is less than the transform size can be supported by an output transfer. For example, if the cyclic prefix and postfix extensions are 256 samples, then IFFT/FFT 108 starts the output transfer 256 samples before the end of the symbol. IFFT/FFT 108 transfers the last 256 samples, for example, four per clock, then transfers the entire symbol by wrapping back to address zero in FFT state memory. Finally, IFFT/FFT 108 transfers the 256 sample at the beginning of the symbol by wrapping to zero again. The wrapping to zero is accomplished by defining a starting logical sample address and a modulo value for the output transfer. The actual memory addresses can be calculated by applying digit reversal and then an appropriate algorithm, such as the FAST algorithm, which one of skill in the art will appreciate.

IFFT/FFT 108 can also assist the cyclic extension by transferring the data at the beginning of the symbol twice. In one embodiment, the two transfers include once at the beginning and once at the end. The Beta window as provided in the VDSL specification requires a table to store the window function. A FIFO can provide a separate register file for this purpose. Separate copies of the cyclic prefix parameters can be maintained for each ADSL channel in the register file since they are read out of the FIFO in a round robin fashion.

Core 102 is configured to be able to adjust the input and output pointers of FIFO 126 to perform symbol synchronization and timing advance. The TX FIFO 126 is sized at least 2.5 times the sample size to support the adjustment.

AFE 112 interfaces engine 100 to a VDSL AFE or up to four ADSL AFEs. AFE 112 can be designed to be flexible enough to support existing and future AFEs and support the data interfaces of multiple ADSL AFEs simultaneously. In addition to the data buses, a dedicated serial interface can be provided for use in controlling the AFEs. Thus, in one embodiment, AFE interface 112 can be configured to be flexible enough to support many devices.

In one embodiment, a programmable FIR engine is included for the transmit path at the front end of AFE interface 112, shown as transmit time domain Co-Processor (TXCP) 110. In another embodiment, TXCP 110 includes an FIR engine, a one to 32× interpolation stage, and a second FIR engine. In this embodiment, the additional components can be configured to support different specifications such as ADSL/2/2+ and to provide better digital filtering for VDSL.

Receive Path Operation

Figure 5:
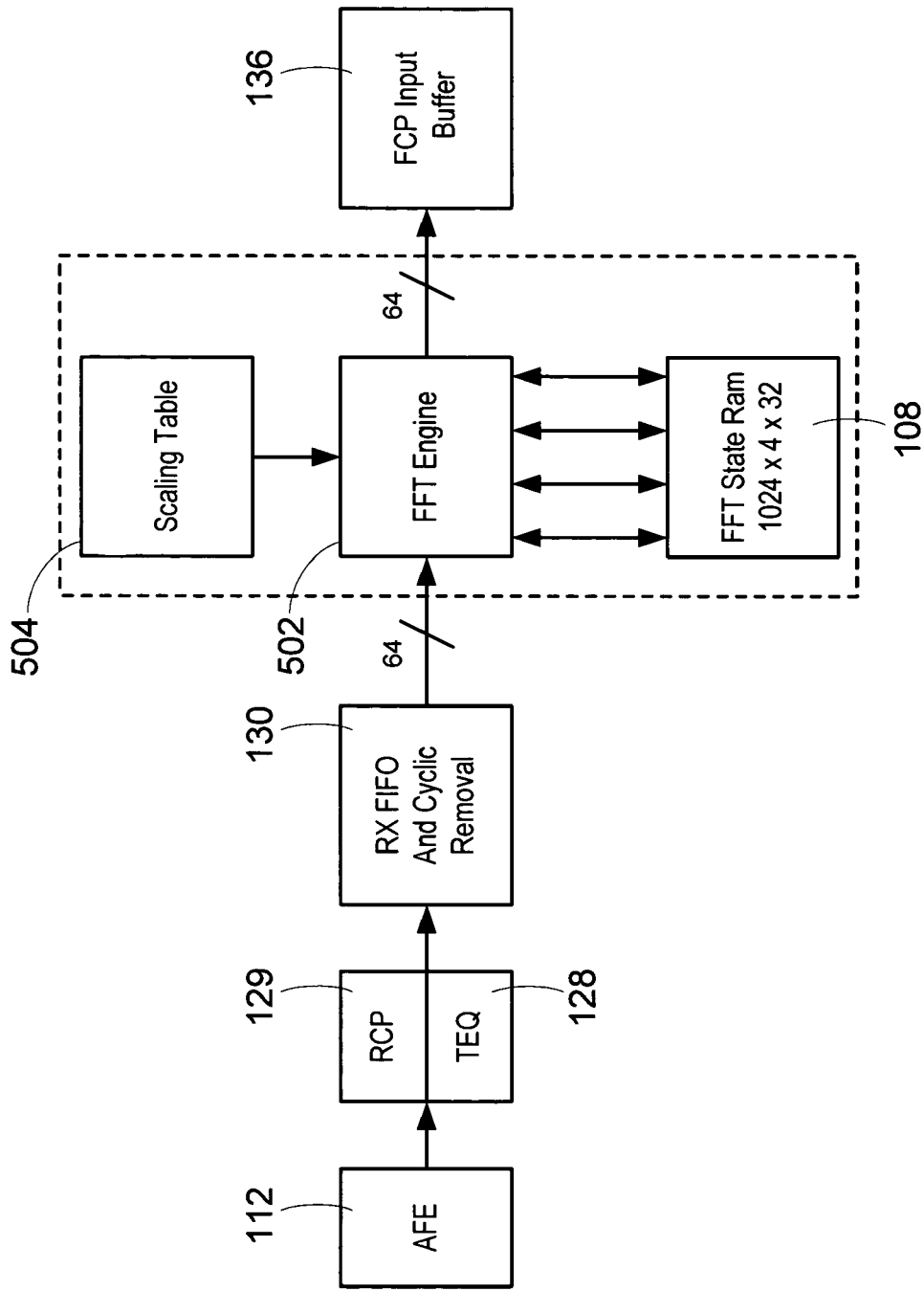
FIG. 5 is a block diagram illustrating IFFT/FFT functionality interactions for a signal receive path in accordance with an embodiment of the present invention.

Referring now to FIG. 5 in combination with FIG. 1, the receive path is shown in a block diagram. Like the transmit path, the receive path receives one 16-bit sample per sample clock, for example, from AFE 112 in VDSL mode. Received VDSL data is filtered by a TEQ filter in RXCP 129 before being stored in receive FIFO 130. TEQ filter in RXCP 129 can be a 16 tap FIR that is calculated by RXCP (Receive Time Domain Co-Processor) 129. RXCP 129 requires four multipliers to be able to calculate one TEQ output per 35.328 MHz clock. In VDSL Showtime operation RXCP 129 performs TEQ calculations in a serial fashion and writes its data to the receive FIFO 130. However, for multi-channel ADSL modes RXCP 129 must perform calculations for up to four channels. Since ADSL sample rates are much lower, RXCP 129 requires no additional processing capabilities. However, RXCP 129 needs additional memory for the TEQ filter delay lines and coefficients.

In an embodiment, RXCP 129 can be configured to include a decimator, and FIR engine, a second decimator, and a second FIR engine to perform time domain equalization.

Like transmit FIFO 126, receive FIFO 130 is implemented as a single port 64 bit wide ram. Receive FIFO 130 is configured with read and write pointers that are controllable by core 102 for use in symbol alignment. FIFO 130 can also be programmed to discard the cyclic prefix and can be logically partitioned into four FIFOs for multi-channel mode. After symbol synchronization is achieved, receive FIFO 130 can generate a symbol rate timing signal by comparing the number of input samples received to a core 102 defined threshold. The symbol rate timing signal defines the symbol boundary that can be used to trigger the FFT operation. For a normal symbol, core 102 is configured to adjust the FIFO pointers to effectively discard any cyclic extension (prefix and postfix). In engine 100, symbol synchronization occurs once during training. During training, a timing change occurs between the receiver components and the transmit components. IFFT/FFT 108 has a fixed processing time, thus to line up timing components and allow IFFT/FFT 108 and other components to complete operations, symbol times are extended. Transmit FIFO 126 is configured to contain enough data to continue to supply AFE 112 during such an extension, up to one symbol.

FFT for Receive Functionality

Referring to FIG. 1 in combination with FIG. 5, when IFFT/FFT 108 is available for performing an FFT, a symbol of data (8192×16) is burst transferred into IFFT/FFT 108 on a dedicated 64 bit bus. Similar to the transmit path, single-ported receive FIFO 130 causes the burst to lose cycles while TXCP 110 is writing the FIFO 130. The cyclic prefix data is discarded by the FIFO logic and not transferred to FFT engine 502 within IFFT/FFT 108. FFT engine 502 needs about 12000 cycles (including TX FIFO 126 input transfer) to perform the FFT and another 1024 to write the results to FCP 113. FFT engine 502 takes advantage of the idle butterfly hardware to perform output scaling using scaling table 504 during the output transfer. Only the active receive tones are transferred, based on a TX/RX frequency map, which can be implemented as a set of registers in the IFFT/FFT 108. The system clock can be run independent of the AFE sample clock in one embodiment, or can be run as dependent on the AFE sample clock, according to system requirements which can be appreciated by one of skill in the art. The time can be used for DMA access to the FFT state memory or scaling tables. The time may not be enough to DMA transfer the complete state memory of the FFT block if FFT/IFFT processing must continue at the symbol rate. However, the active bins can be DMA transferred out of the FCP 113, instead or the state memory can be transferred using a core 102 memory copy. Core 102 controlled memory can copy one word per clock while DMA transfers require two clocks per word.

Figure 6:
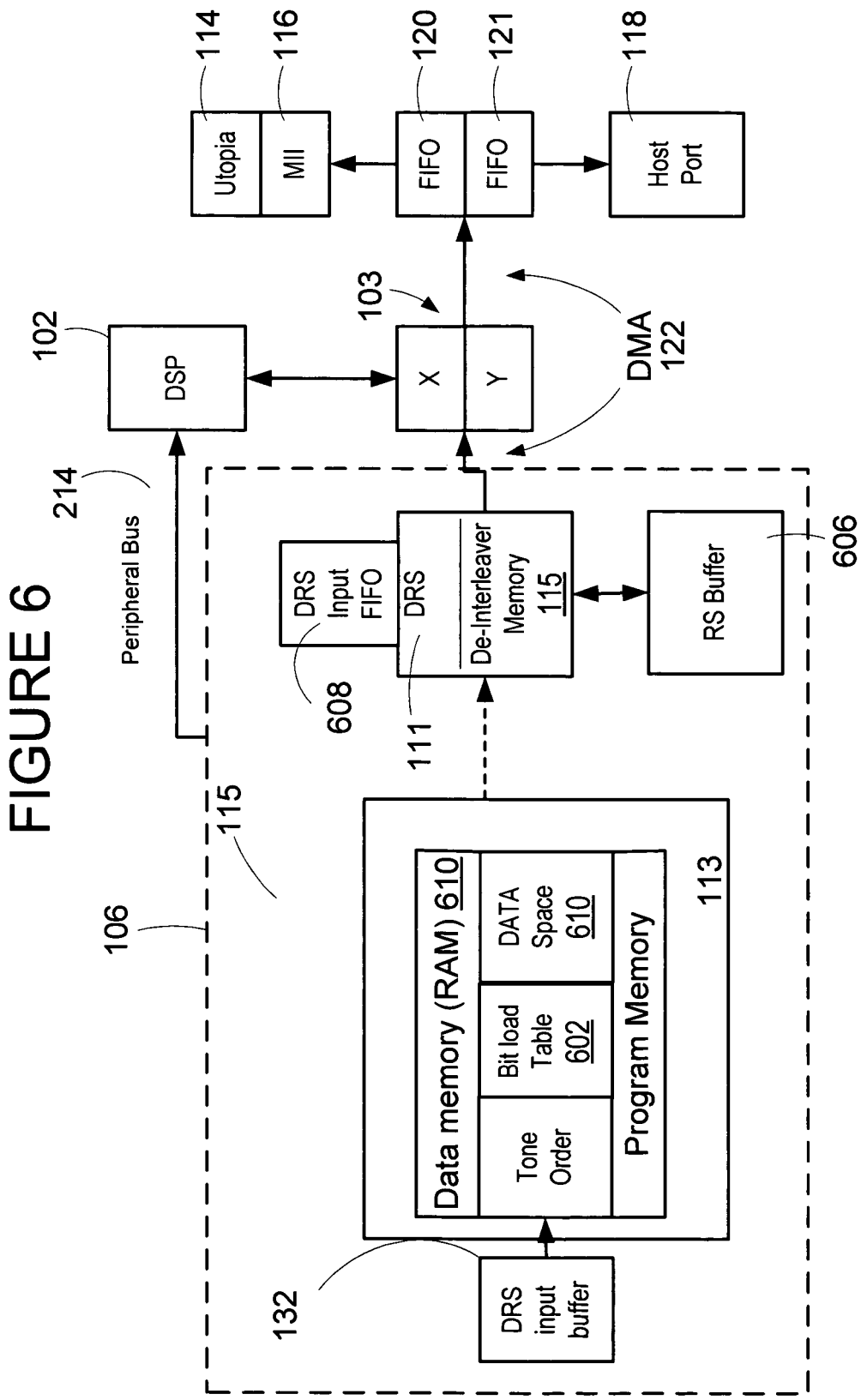
FIG. 6 is a block diagram illustrating decoder functionality in accordance with an embodiment of the present invention.

Referring now to FIG. 6, receive paths through decoder 106 are illustrated. FFT output transfers are transmitted to decoder 106 FCP buffer 134 via point-to-point bus 270. FFT output transfers have the highest priority for access to the FCP buffer 134. Therefore, the FFT transfer will not be stalled by other FCP operations. FCP 113 is triggered to begin processing by core 102 or by the completion of the FFT transfer. FCP 113 performs the FEQ filtering (including filter training), slicing, Viterbi decoding, SNR calculations, and framing. To save processing time and hardware requirements the FCP 113 only operates on the active bins for the receive direction. FCP 113 performs reverse tone ordering as it reads the data out from buffer 134. Therefore, the complex points are fetched from the buffer in the order they need to be reassembled to form a de-interleaver bit stream. FCP 113 is coupled to de-interleaver memory 115, to pass data to DRS 111. To facilitate training symbol recovery, in one embodiment, FCP 113 also has a pseudo-random number generator and tone rotator.

FCP 113 can be implemented as a specialized complex data processor that is capable of performing all FEQ, SNR, and slicing operations. FCP 113 can contain its own program space that is written by core 102. Since FCP 113 works on one frequency bin at a time, it normally discards partial results and does not require a lot of temporary storage RAM. However, it can be programmed to load partial results, such as FEQ calculations, and the like, into the FCP input buffer 132 for access by core 102. FCP 113 is coupled to bit load table 602 that can include signal to noise ratio memory and coefficient memory.

To guarantee that decoder 106 completes in one sample period FCP 113 is configured to complete its operations in about 75% of a sample period. For VDSL, that equates to 13 clocks per frequency bin in the worst case. Other decoder functions can occur in parallel with FCP 113 operations once enough data is available to start the pipelines.

When FCP 113 has re-assembled the bit stream it writes the data into a DRS input FIFO 608 via a point-to-point transfer. DRS input FIFO 608 is needed, in part, because the FCP 113 output is bursty while DRS 111 operation is pipelined. The front end of DRS 111 pipeline can be configured as a de-interleaver. De-interleave memory 115 is available for use by core 102 during training in the same fashion as SRS 105 interleave memory. DRS 111 can also perform Reed-Solomon decoding, CRC checking, and de-scrambling. The de-interleave function is performed by the addressing logic as data is fetched for Reed-Solomon decoding. Unlike the Reed-Solomon encoder, decoder 106 needs to have access to a full code word of data in case it needs to make corrections. Therefore, the Reed-Solomon decoder has a local 256 byte buffer 606 to hold the maximum sized Reed-Solomon code word. Reed-Solomon decoder in DRS 111 can be configured to wait for an entire codeword from input FIFO 608 to be available in the de-interleaver before starting the decode because a symbol of data does not necessarily contain an integer number of code words. Otherwise, temporary storage would be required to save the state in multi-channel mode.

In one embodiment, DRS input buffer 608 is treated like a FIFO with programmable watermarks. The watermarks can be used to trigger the FCFS circuitry for the DRS and select the next channel for processing. The watermarks can be configured to trigger when a codeword is available and is set to indicate a size, for example, for a full codeword for each channel.

After any corrections are made the data is de-scrambled. Cyclic redundancy check (CRC) checks are performed at superframe boundaries and for the VDSL overhead control channel (VOC) and other the fast bytes are extracted and stored in FIFOs for core 102 accesses. DRS 111 further includes de-framing logic with the same degree of programmability as the framer in SRS 105. The final output of the block is DMA transferred to core 102 memory or directly to the interface FIFO. When data is sent to core 102 memory, another DMA transfer will be required to move it to the interface FIFOS.

Peripheral Memory Map

Figure 2A:
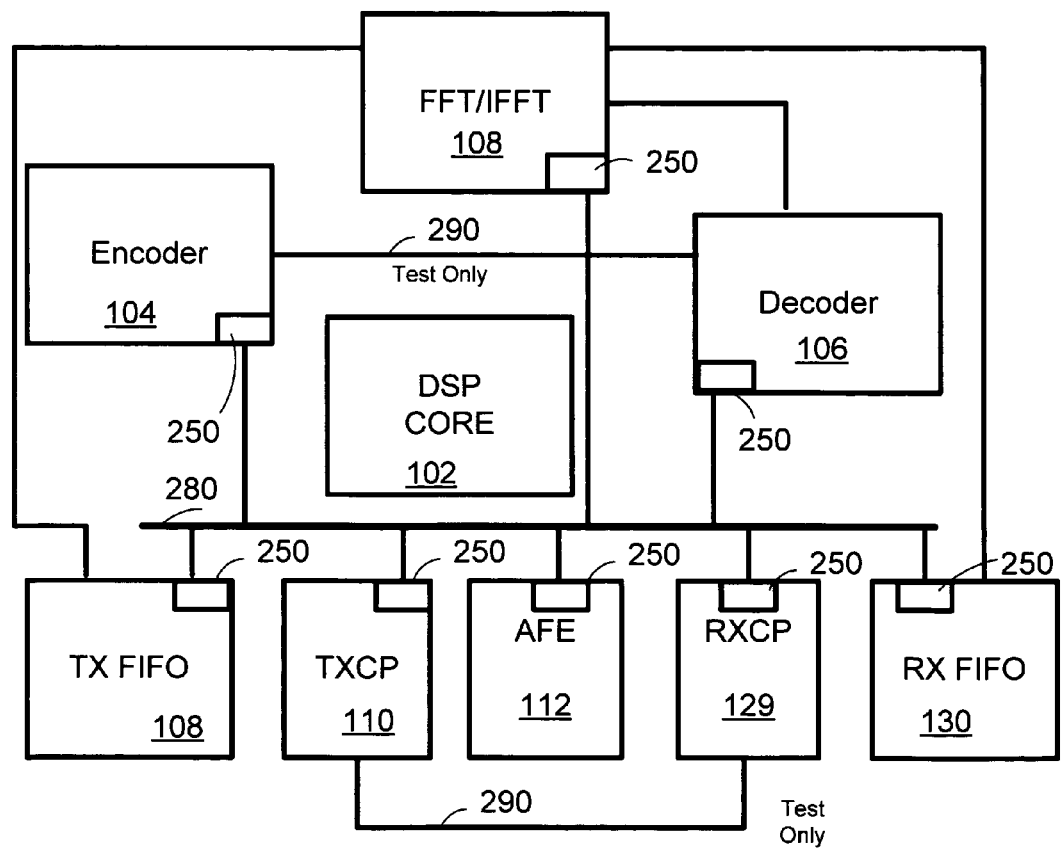
FIG. 2A is a block diagram of portions of the ASIC shown in FIG. 1 illustrating a peripheral bus and peripheral memory configuration in accordance with an embodiment of the present invention.

Referring now to FIG. 2A, engine 100 uses distributed processing and much of the memory is distributed as well. As shown, each peripheral processor module, including FFT/IFFT 108, encoder 104, decoder 106, TX FIFO 108, TXCP 110, AFE 112, RXCP 129 and RX FIFO 130, can be configured to include local RAM and/or ROM. If all of these memories were mapped directly into engine 102 X/Y data space the clock rate of the device would be limited by the speed of those data buses. Also, if local memories are 32 bits wide, such a configuration makes it difficult to directly map them into the 24 bit data buses. To avoid these issues, local memories are configured to be indirectly mapped using a memory port 250 located in each peripheral module. Memory ports 250 provide core 102 access to all memories on engine 100. More particularly, as shown, each of the memory ports 250 are coupled to bus 280. The ports 250 can be designed to provide full speed access to the memories for block data transfers. Also shown in FIG. 2A, are direct connections 290 for purposes of testing. Direct connections 290 are shown between encoder 104 and decoder 106; and shown between RXCP 110 and RXCP 129.

Each memory port 250 can be configured to include an X or Y peripheral I/O mapped address and data registers and an associated state machine. An address register can be used to specify the address for access within a local memory as well as an optional auto-increment or auto-decrement function. A data register can be used by core 102 as the data interface for all reads and writes to the local memory. When the Address register is written by core 102, the state machine issues a read to the local memory and stores the memory output in a Data register. Core 102 can then read that memory location by reading the Data register. If the Address register is setup for auto-increment or auto-decrement then each core 102 read to the Data register will update the Address register and cause another local memory read. Since the data is always pre-fetched in anticipation of a read, the Data register can be read on every core 102 cycle after the Address register is setup. The operation is the same for writes except that the core 102 can issue a write to the Data register. Therefore, block transfers to peripheral memories via ports 250 can occur at the full speed of core 102 data buses. However, each random access to the memories requires a write to an Address register, then a cycle for pre-fetch, and finally an access to the Data register. Therefore, the random access bandwidth of the peripheral memories is about ⅓ of the core 102 data bus speed.

In an embodiment, peripheral memories are 32 bits wide and the memory port state machine maps 32 bit data into 24 bit core 102 buses. Two core 102 bus transactions can be used to transfer each 32 bit word. Accesses to even addresses affect the 16 MSBs of the 32 bit word and odd addresses affect the 16 LSBs. The 16 bit quantities are packed into the MSBs of the 24 bit word and the 8 LSBs are padded with 0s. Since two core 102 writes are required to update each memory location, the local memory write cycle will only occur after the second (odd) location is written.

The following table lists all of the distributed memories in engine 100 and shows how they are mapped into each peripheral's memory port 250 address space. As shown, the memories are addressed as 16 bit quantities and the Start and End addresses are the values that would be written to the Address register for that module.

TABLE 1

| Module | Memory | Size | Start Address | End Address |
|---|---|---|---|---|
| FFT | State RAM 0 | 1Kx32 | 0000 | 07ff |
|  | State RAM 1 | 1Kx32 | 0800 | 0fff |
|  | State RAM 2 | 1Kx32 | 1000 | 17ff |
|  | State RAM 3 | 1Kx32 | 1800 | 1fff |
|  | FFT Post-Scale RAM | 1Kx32 | 2000 | 27ff |
|  | IFFT Pre-Scale RAM | 1Kx32 | 2800 | 2fff |
|  | Twiddle ROM 0 | 512x32 | 3000 | 33ff |
|  | Twiddle ROM 1 | 512x32 | 3400 | 37ff |
| SRS | Interleaver RAM | 8Kx32 | 0000 | 3fff |
| DRS | De-Interleaver RAM | 8Kx32 | 0000 | 3fff |
|  | Input FIFO | 1Kx32 | 4000 | 47ff |
| TRACTOR | State RAM 0 &1 1536x32 RAMS interleaved addr. | 3072x32 | 0000 | 17ff |
| FCP | State RAM 0 &1 5120x32 RAMS interleaved addr. | 10240x32 | 0000 | 4fff |
|  | Reserved | 6144x32 | 5000 | 7fff |
|  | Program RAM | 512x32 | 8000 | 83ff |
| FIFO | RX FIFO RAM 0 &1 3584x32 RAMs interleaved addr. | 7168x32 | 0000 | 37ff |
|  | FIFO Coefficient RAM | 64x32 | 4000 | 407f |
|  | Reserved | 8160x32 | 4040 | 7fff |
|  | TX FIFO RAM 0 &1 6144x32 RAMs interleaved addr. | 12288x32 | 8000 | dfff |
| MUT | TX FIFO | 4Kx32 | 0000 | 1fff |
|  | RX FIFO | 4Kx32 | 2000 | 3fff |

System Timing in Showtime

Figure 7:
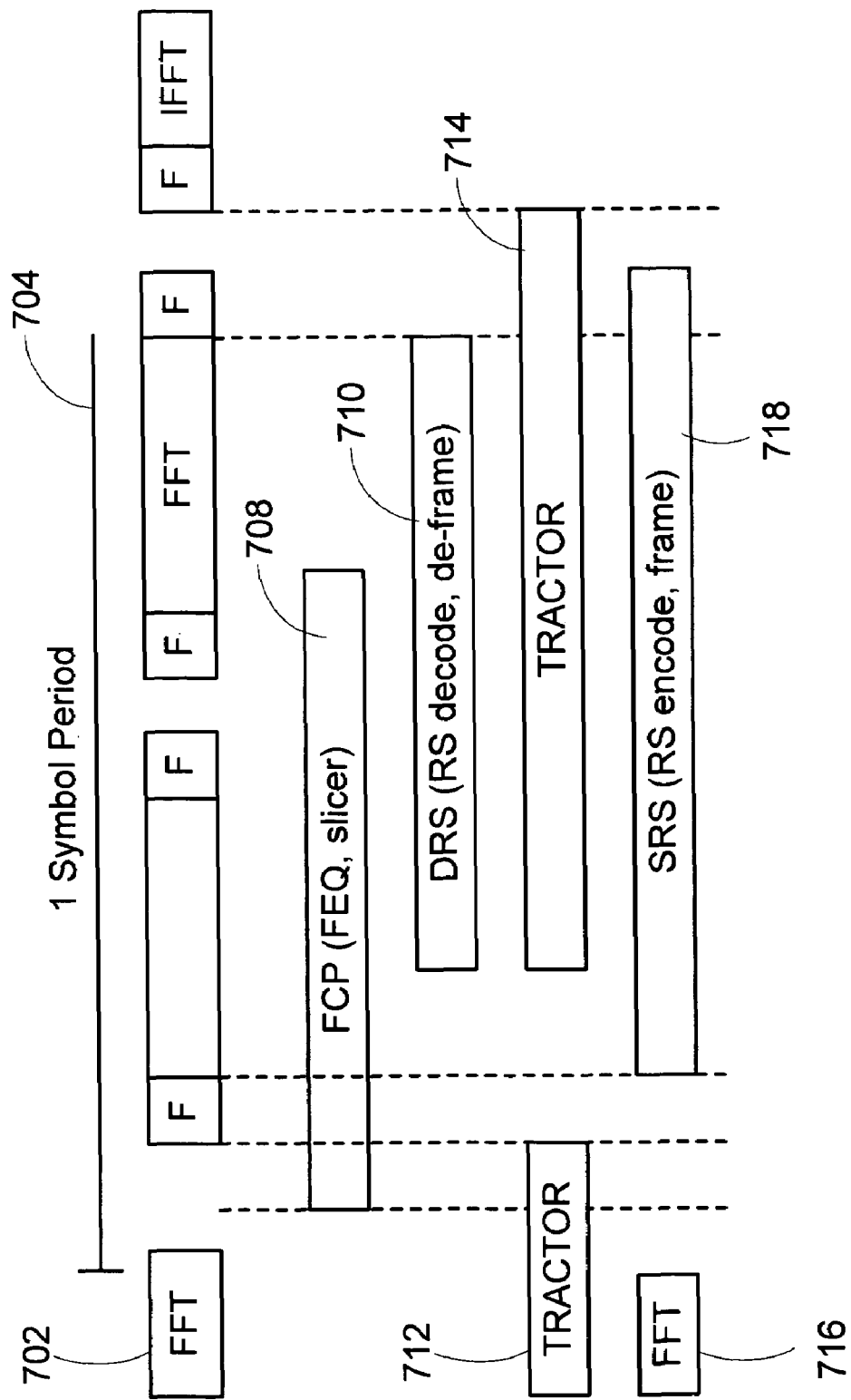
FIG. 7 is a timing diagram illustrating Showtime operation in accordance with an embodiment of the present invention.

Referring now to FIG. 7, a timing diagram illustrates that in VDSL or ADSL Showtime operations, the system is synchronized to a symbol timing signal of approximately 4 kHz. In the case of a customer premise equipment (CPE) modem, the symbol timing signal is extracted from the received symbols. For the central office (CO), the timing signal may be produced by dividing down a sample clock or by sampling an external timing reference.

In an embodiment, engine 100 provides that the system is timed around an event that is synchronous but out of phase with this signal by using the FFT completion interrupt. FFT completion is viewed as the start of symbol for system control purposes. This event was chosen because it is somewhat fixed in time due to the limited resources for performing FFTs and IFFTs.

Referring now to FIG. 7, timing diagrams illustrate the system timing for VDSL. For four-channel ADSL mode the diagram is similar but runs at four times the symbol rate. FIG. 7 illustrates the end of FFT processing 702, which also marks a start of a symbol period 704. F blocks 706 represent times during which the FFT coprocessor is transferring data to and from FIFOs. During these times, the coprocessors that write and read the FIFOs must be idle. This requirement allows the FIFOs to use single-ported RAMs. Encoder 104 and decoder 106 each have a symbol period or FIFO time in which to process a frame of data. To keep hardware buffering to a minimum, SRS 716 and TRACTOR 712 operate on the same data frame, as shown. Since the TRACTOR requires data from the SRS it can only process when data is available. Therefore, there is a delay shown as the difference between RS encode frame 718 and CE encoding startup 714 to prevent possible pipeline stalls when data is not available. A similar situation exists for the FCP and DRS, as shown by the difference between FCP 708 and DRS 710.

In one embodiment, RX FIFO 130 includes a programmable watermark that sets a watermark that can enable a programmable skew between the watermark and beginning of operations of encoder 104. When a watermark is set, the timing reference becomes the watermark and replaces the FFT completion timing reference. When RX FIFO contains a full symbol, operations can begin.

FFT Funtionality

Figure 8:
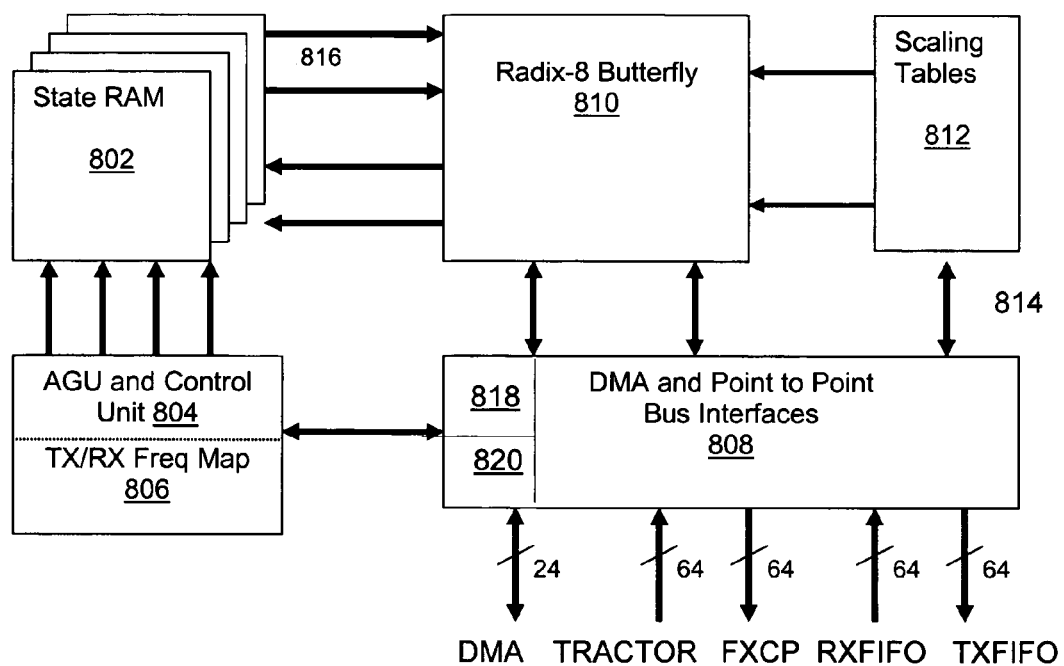
FIG. 8 is a block diagram illustrating an IFFT/FFT architecture in accordance with an embodiment of the present invention.

Referring now to FIG. 8 in combination with FIG. 1, an embodiment is directed to systems and methods associated with IFFT/FFT 108. In general, IFFT/FFT co-processor 108 calculates FFT and IFFT transforms for a DMT data pump. FIG. 8 provides a block diagram of components within IFFT/FFT 108, including a state RAM 802 coupled to receive generated addresses for FFT calculations from address generation unit (AGU) 804. AGU 804 is further responsible for transfers between state memory and external modules location addresses and generates addresses for the state RAM 802 based on transmit and frequency map 806. Blocks 804 and 806 are coupled to DMA and point-to-point bus interfaces 808. DMA and point-to-point bus interfaces 808 are coupled to radix-8 butterfly 810 and to scaling tables 812.

IFFT/FFT 108 performs FFT, IFFT, IFFT pre-scaling, FFT post-scaling, and frequency mapping and format conversion. Some operations occur during data transfers, including frequency mapping (IFFT in, FFT out), IFFT pre-scaling, FFT post-scaling, IFFT post-scaling with one scale value per symbol, and number format conversion (fixed to floating point for input, and floating point to fixed for output).

In an embodiment, IFFT/FFT 108 is in use for approximately 30000 clock cycles during a sample period. To achieve this speed, IFFT/FFT 108 can incorporate a programmable radix-8 hardware butterfly 810, shown in detail in FIG. 9.

As shown in FIG. 8, state RAM 802 can be configured to hold four banks of 1024 complex samples, each complex sample being 32 bits in length, which can be organized with 16 bit-wide real and imaginary parts therein. State RAM 802 receives addresses and control signals from AGU 804, the addresses of which determine the data fed to the radix-8 butterfly 810. Transmit and receive frequency map 806 stores which FFT outputs are used for transmit and which FFT outputs are used for receive operations. Both AGU 804 and transmit and receive frequency map 806 interact with DMA and point-to-point bus interfaces 808 to receive instruction from core 102. Additionally, the amount of data transferred over interfaces 808 is tracked for control purposes.

Butterfly 810 can be configured to calculate one complex radix-8 butterfly per 4 clocks. State RAM 802 and butterfly 810 have four buses there between. Two of the four buses 816 transmit two complex samples to butterfly 810. Two of the four buses 816 transmit complex samples to state RAM 802. Butterfly 810 transmits and receives samples to and from DMA and point-to-point bus interfaces 808. More specifically, data received by interfaces 808 is scaled in butterfly 810 prior to transfer to and from state RAM 802.

Butterfly 810 further interacts with scaling tables 812, which can be configured with 2048 16 bit wide locations for holding scaling factors for use during FFT processing, and 2048 16 bit wide locations for holding scaling factors for use during IFFT processing. The scaling factors can be used to multiply each data point before or after IFFT and FFT processing. Scaling tables 812 are coupled to DMA and point-to-point bus interfaces 808 allowing the scaling factors to be written by core 102.

DMA and point-to-point bus interfaces 808 provide a method to write and retrieve data and control information to butterfly 810, scaling tables 812 and AGU 804 from other components in engine 100, such as core 102, TRACTOR 107, FCP 113, RX FIFO 130 and TX FIFO 126. To control butterfly 810 and scaling tables 812, an embodiment provides for a control bus 814. DMA and point-to-point bus interfaces 808 enable the DMA and point-to-point buses to both supply data. In one embodiment, a peripheral bus provides primary control and the point-to-point bus provides an "active" signal to also provide some control. IFFT/FFT 108 listens for an active signal to determine when there is data available from the source (RXF or TRACTOR). IFFT/FFT 108 can be programmed to start running when that signal goes active. In one embodiment point-to-point input "active" signals could occur at the same time or in different orders. To better support an Automatic mode, IFFT/FFT 108 can be programmed to take the first available or to always toggle between running an FFT and an IFFT.

Butterfly 810 and state RAM 802 implement an in-place FFT algorithm and floating point calculations to reduce memory requirements, thereby overwriting prior calculations stored in state RAM 802. Beneficially, an in-place FFT algorithm and floating point usage limits internal state memory, state RAM 802, to 4096 complex samples of 32 bits each. The 4096 complex samples are separated into four banks of 1024 samples each to provide the memory bandwidth required by butterfly 810. During FFT calculations, the butterfly hardware reads two complex samples and writes two complex samples per clock as shown by buses 816.

According to an embodiment, during input and output data transfers all samples are passed through the butterfly logic before being written to state RAM 802. Requiring all samples to pass through the butterfly logic prior to being written to state RAM 802 allows the butterfly to efficiently apply scaling coefficients as the data is read from or written to state RAM 802.

To provide sufficient data to the butterfly on every clock cycle, a complex memory organization and addressing scheme can be employed. AGU 804 is responsible for generating the addresses for FFT calculations and for transfers between state memory and external modules. During FFT processing, AGU 804 generates two read and two write addresses per clock cycle. The read and write addresses are applied to four state memory banks 802. During external module data transfers, AGU 804 can translate incoming/outgoing sample index into a state bank and RAM address. All state memory transfers except DMA involve pairs of samples. Thus, AGU 804 can perform two translations per clock.

IFFT/FFT 108 is used by both transmit and receive data paths and can have dedicated point-to-point buses 808 for both paths. For the transmit path, IFFT/FFT 108 receives data that was encoded in TRACTOR 107 via output FIFO 134 and sends data to transmit FIFO 126. For the receive path, IFFT/FFT 108 receives data from the RX FIFO 130 and writes it to the FCP 113 at input FIFO 132. Point-to-point buses 270 can be sized at 64 bits so that they can carry two complex samples and four real samples per clock. The bandwidth avoids having IFFT/FFT 108 spend excessive time doing data transfers and avoids requiring dual port RAMs in the input and output FIFOs 132 and 134.

According to an embodiment, the central location of IFFT/FFT 108 is used to enable the buses 270 and DMA 122 useful for data routing requirements other than the normal Showtime data flow. Therefore, the bus interfaces 808 of IFFT/FFT 108 are capable of performing a loop back from TRACTOR 107 to the FCP interface 113. More specifically, as shown in interfaces 808, TRACTOR 107 and FCP 113 can be directly coupled through interface 808 for testing frequency domain components in isolation outside of Showtime.

The IFFT/FFT 108 interfaces 808 includes a DMA interface that can be used to transfer data to/from any internal memory on engine 100. In one embodiment, DMA bus is logically connected to all memories. Therefore, a transfer can occur between the FFT and X/Y/P RAM, or the FFT and the RAM in another peripheral block. In an embodiment, IFFT/FFT 108 can be configured to be idle during state data transfers if internal memories are not dual ported.

Core 102 access to the FFT coprocessor 108 can be accomplished using program controlled I/O or DMA. In either case, the module appears as a set of registers to core 102. Rather than memory mapping the FFT coprocessor's local memory in core 102, an embodiment provides memory access port 818 via DMA and peripheral bus interfaces. More specifically, the peripheral bus interface is used when core 102 accesses a memory mapped register using a peripheral input/output interface. To core 102, memory access port 818 appears as a set of memory mapped registers. The access port simplifies the integration of IFFT/FFT 108 into engine 100 without significant reduction in memory bandwidth for burst transfers.

In one embodiment, bus interface 808 includes peripheral input/output registers 820 that are used by IFFT/FFT 108 as part of the standard interface capable of interfacing with one or more of co-processors 104, 106, 108, 110, 112 and 129. The interface can be implemented as a programmer's interface that shares qualities for each coprocessor. Input/output registers 820 can include a control register to hold general controls such as reset and interrupt enables; a status register can contain interrupt and other status information. The Memory Port registers 818 can be used to provide core 102 access to the IFFT/FFT 102 internal memories.

In one embodiment, IFFT/FFT 108 includes an auto-increment and other like addressing modes to facilitate DMA block transfers through memory access port 818. The configuration register holds module specific configuration information such as the FFT size and radix.

In an embodiment, IFFT/FFT 108 is configured to hold five memory instances mapped into the address space of memory port 818, which can be four 1K×32 and one 2K×32. Logically, the four 1K×32 memories can be configured as state memory mapped into the memory port address space as one sequential 8K×16 memory. Similarly, the 2K×32 scale factor memory can be mapped into a sequential 4K×16 address range. IFFT/FFT 108 can also be configured with two 512×32 ROMs mapped into memory port 818 address space for testing purposes. Memory port 818 address map can vary depending on the number of channels that IFFT/FFT 108 is configured to process as shown in the following tables.

TABLE 2

Memory Port Address Map - 1 channel

| Name | Size | Start Address | End Address |
|---|---|---|---|
| State Ram 0 | 2Kx16 | 0000 | 07ff |
| State Ram 1 | 2Kx16 | 0800 | 0fff |
| State Ram 2 | 2Kx16 | 1000 | 17ff |
| State Ram 3 | 2Kx16 | 1800 | 1fff |
| FFT Post-Scale Ram | 2Kx16 | 2000 | 27ff |
| IFFT Pre-Scale Ram | 2Kx16 | 2800 | 2fff |
| Twiddle ROM 0 | 1Kx16 | 3000 | 33ff |
| Twiddle ROM 1 | 1Kx16 | 3400 | 37ff |

TABLE 3

FFT Memory Port Address Map - 2 channel

| Name | Size | Start Address | End Address |
|---|---|---|---|
| State Ram 0 | 2Kx16 | 0000 | 07ff |
| State Ram 1 | 2Kx16 | 0800 | 0fff |
| State Ram 2 | 2Kx16 | 1000 | 17ff |
| State Ram 3 | 2Kx16 | 1800 | 1fff |
| FFT Post-Scale Ram - Channel 0 | 1Kx16 | 2000 | 23ff |
| FFT Post-Scale Ram - Channel 1 | 1Kx16 | 2400 | 27ff |
| IFFT Pre-Scale Ram - Channel 0 | 1Kx16 | 2800 | 2bff |
| IFFT Pre-Scale Ram - Channel 1 | 1Kx16 | 2c00 | 2fff |
| Twiddle ROM 0 | 1Kx16 | 3000 | 33ff |
| Twiddle ROM 1 | 1Kx16 | 3400 | 37ff |

TABLE 4

FFT Memory Port Address Map - 4 channel

| Name | Size | Start Address | End Address |
|---|---|---|---|
| State Ram 0 | 2Kx16 | 0000 | 07ff |
| State Ram 1 | 2Kx16 | 0800 | 0fff |
| State Ram 2 | 2Kx16 | 1000 | 17ff |
| State Ram 3 | 2Kx16 | 1800 | 1fff |
| FFT Post-Scale Ram - Channel 0 | 512x16 | 2000 | 21ff |
| FFT Post-Scale Ram - Channel 1 | 512x16 | 2200 | 23ff |
| FFT Post-Scale Ram - Channel 2 | 512x16 | 2400 | 25ff |
| FFT Post-Scale Ram - Channel 3 | 512x16 | 2600 | 27ff |
| IFFT Pre-Scale Ram - Channel 0 | 512x16 | 2800 | 29ff |
| IFFT Pre-Scale Ram - Channel 1 | 512x16 | 2a00 | 2bff |
| IFFT Pre-Scale Ram - Channel 2 | 512x16 | 2c00 | 2dff |
| IFFT Pre-Scale Ram - Channel 3 | 512x16 | 2e00 | 2fff |
| Twiddle ROM 0 | 1Kx16 | 3000 | 33ff |
| Twiddle ROM 1 | 1Kx16 | 3400 | 37ff |

In an embodiment, IFFT/FFT 108 is equipped with a low-power gated clock mode, which can be implemented with either an AND gate or an OR gate, for example coupled to a clock. Setting the soft reset bit of the control register will prevent any clocked circuits downstream from the clock gating logic from receiving transitions on the clock. Thus, all logic can be reset and will use minimal power due to the removal of the clock.

During Showtime operation, in one embodiment IFFT/FFT 108 can perform 4000 FFT and 4000 IFFT transforms per second. Rather than performing an 8192 point real to complex FFT, the architecture for IFFT/FFT 108 can provide for splitting the input into a real portion and an imaginary portion and perform a 4096 point complex FFT to reduce the number of operations required by approximately one half. The reduction is accomplished by performing 4096 point complex transforms and then post-processing the results to produce the required 8192 points. Thus, the required local storage is also reduced by one half. For IFFT processing, the input is also split into a real portion and an imaginary portion, resulting in a reduction in approximately of have of the number of operations.

Figure 9:
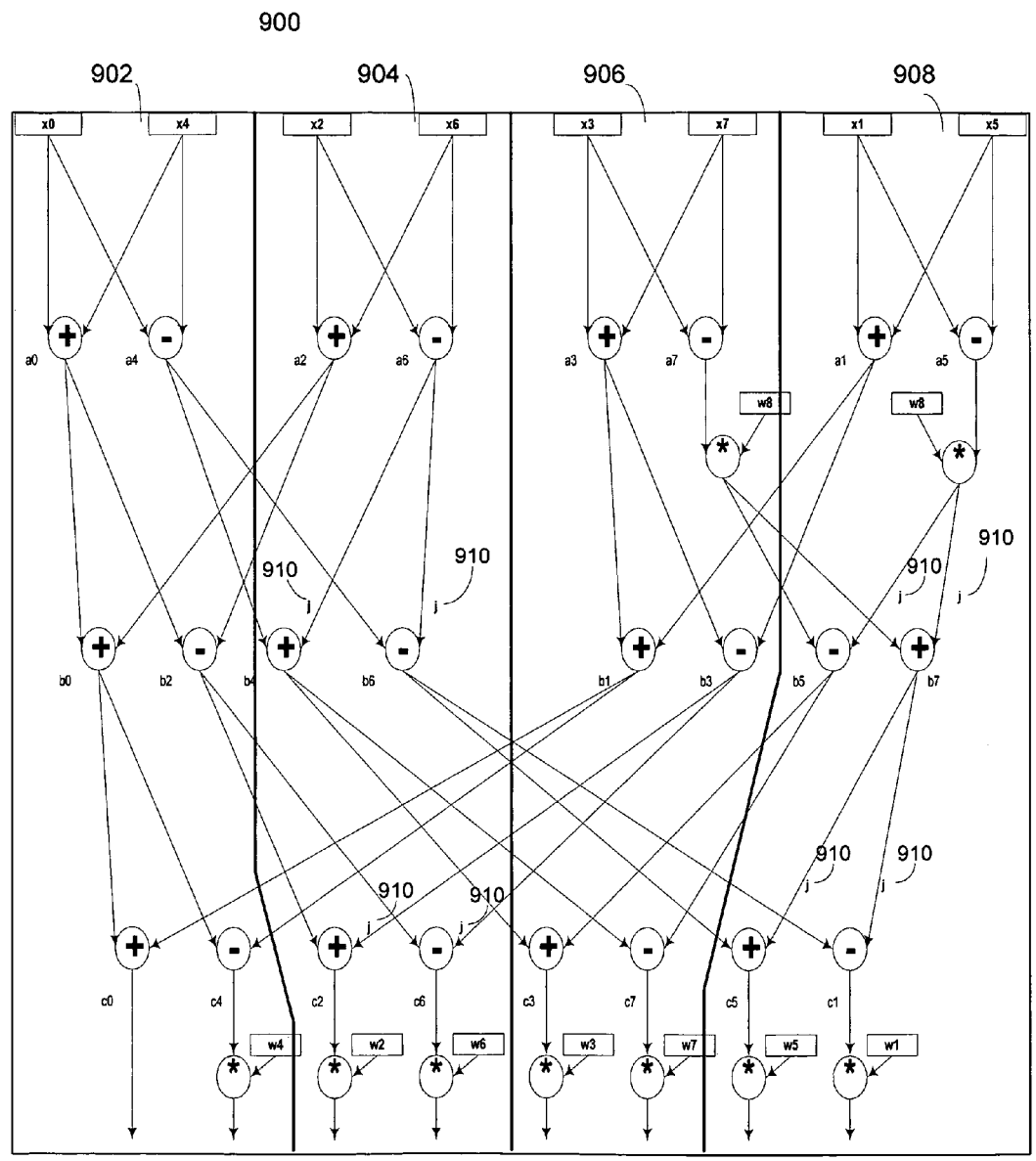
FIG. 9 is a diagram of a radix-8 butterfly architecture in accordance with an embodiment of the present invention.

In one embodiment, a clock appropriate for engine 100 can be a 141.312 MHz clock. As a result, IFFT/FFT 108 requires at least six hardware math units. In the embodiment, as shown in FIG. 9, a pipelined hardware butterfly is used to perform the math units.

According to one implementation, for each 250 μs symbol period there are 35,328 clock periods available for FFT/IFFT processing. In the implementation, butterfly 900 performs a single transform in about 10,000 clocks using a radix-8 butterfly 900. There are a number of ways that the radix-8 calculations could be scheduled across multiple clocks. Since there are 24 complex adds and nine complex multiplies per butterfly a four cycle butterfly requires at least six complex adders and 2.25 complex multipliers implemented as two complex multipliers and one real multiplier. In an embodiment, a minimal amount of hardware is used by having butterfly 900 vertically sliced across four logical time slices. Thus, the first time slice calculates (a0, a4, b1, b3, c1, c5) in block 902, the second calculates (a2, a6, b1, b3, c0, c4) in block 904, the third calculates (a3, a7, b0, b2, c2, c6) in block 906, and the fourth calculates (a1, a5, b4, b6, c3, c7) in block 908. Using vertical slicing keeps the six adders busy on every clock cycle but slightly under utilizes the multipliers. A temporary storage register shown as 1014 and 1020 in FIG. 10 at all locations in butterfly 900 where the arrows cross clock boundaries. However, the registers can be shared across multiple clocks so that only 12 are needed.

Butterfly 900 illustrates a simplified representation of the radix-8 butterfly pipeline. The maximum number of hardware elements required in any one block of butterfly 900 includes six complex adders and three complex multipliers. As shown, butterfly 900 illustrates different hardware configurations in blocks 902, 904, 906, and 908. The operations are scheduled over the blocks 902, 904, 906, and 908 over multiple clock cycles. The pipeline is started once per FFT stage and operates continuously over 512 butterflies in order to perform a 4096 point FFT or IFFT. Although there is an initial delay while the pipeline is filled, the throughput of the pipeline is one butterfly per four clocks.

The pipeline accepts data in fixed point or floating point data formats. In one embodiment, format converters are provided for use at one or both of the beginning and ending of pipeline processing to provide flexibility. The format converters enable pipeline operations to occur in a floating point format with a four bit exponent and a mantissa that gains precision after each math operation. In an embodiment, rounding can occur at the end of the pipeline.

Figure 10:
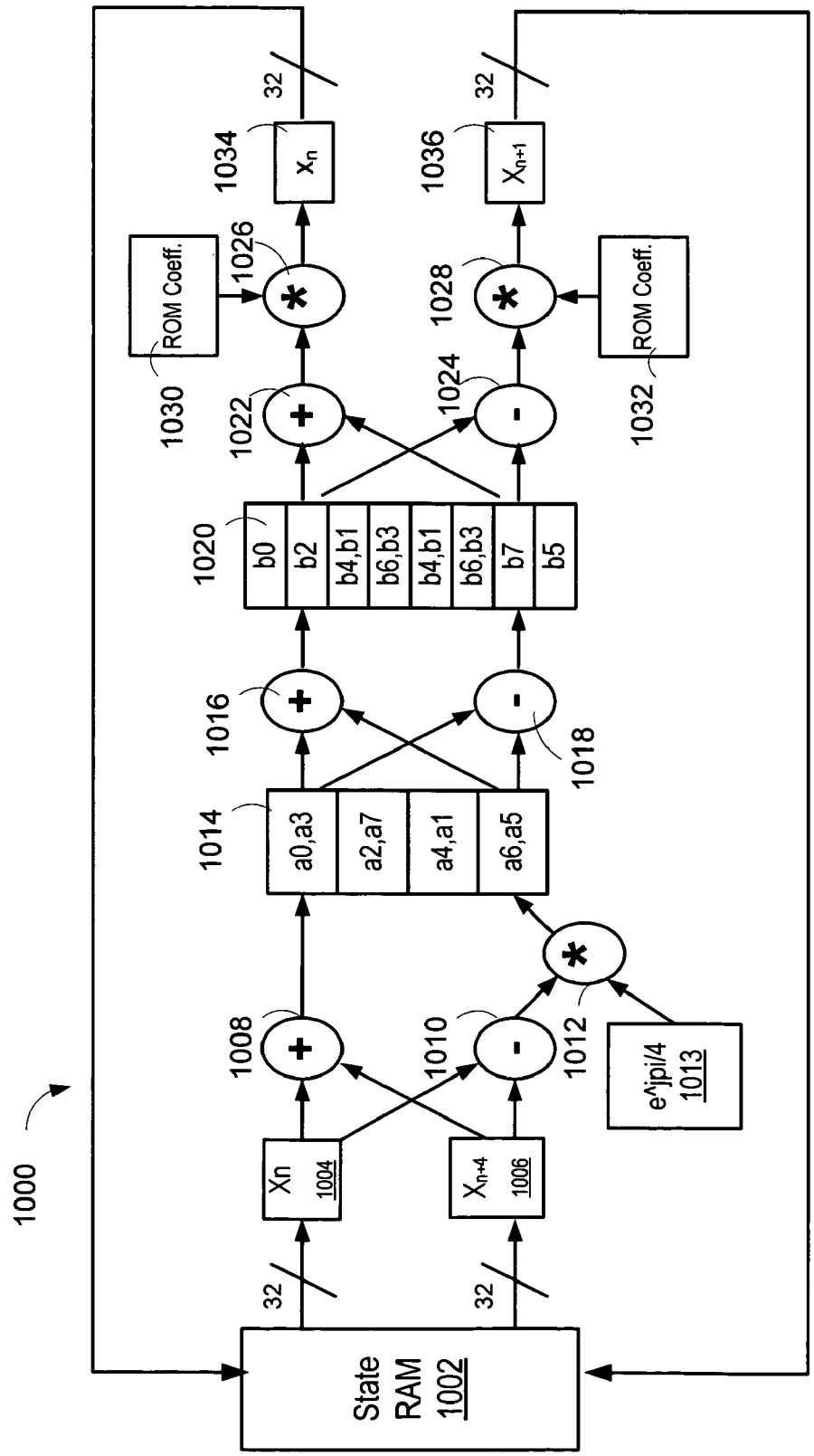
FIG. 10 is a block diagram of hardware components used to calculate partial products within a butterfly configuration for FFT and IFFT calculations in accordance with an embodiment of the present invention.

In one embodiment, butterfly 900 can be configured to alter the order of the additions and multiplies in Stage 3 such that they can be reversed to better support FFT/IFFT fold calculations. Also, j multipliers 910 can be applied to the register outputs to alter the sign of outputs and exchange real and imaginary components. Additional pipeline features can be controlled by microcode. Up to four pipeline instructions can be used to control the pipeline on consecutive clocks. The four instructions can be repeated continuously during the processing of an FFT/IFFT stage. In one embodiment, butterfly 900 can perform a radix-2 and radix-4 which require fewer microcode instructions. Referring to FIG. 10, in one approach, a radix-4 requires the use of blocks 1016, 1018, 1022, and 1024 and only two cycles of microcode instructions. For a radix-2, butterfly 900 uses blocks 1022 and 1024 and requires one microword instruction. To implement the alternative radix operations, an embodiment provides for a "no operation" (NOP) for portions of butterfly 900 that are not required.

Referring now to FIG. 10 in combination with FIG. 9, a scheduling diagram 1000 illustrates hardware to perform an exemplary vertical slice as shown in FIG. 9, blocks 902, 904, 906 and 908. FIG. 10 further illustrates that several partial products must be saved in a register, such as register 1020, for later use. The data flows from state RAM 1002 through two 32 bit buses into registers $x_n$ 1004 and $x_{n+4}$, 1006 and then to a complex adder 1008 and complex subtractor 1010. Data from complex subtractor 1010 is multiplied at multiplier 1012 by $e^{j\pi/4}$. The data is then provided to a register bank 1014 as shown. As shown, each register holds a different partial product. Register bank 1014 is coupled to complex adder 1016 and complex subtractor 1018, which operate on the partial products in register bank 1014. The outputs of complex adder 1016 and complex subtractor 1018 are provided to register bank 1020.

Register bank 1020 illustrates that partial products b1, b3, b4 and b6 are present in two registers. Data is output from register bank 1020 and provided to complex adder 1022 and complex subtractor 1024. Outputs of each adder 1022 and subtractor 1024 are then multiplied in respective multiplier 1026 and 1028, by respective ROM coefficients 1030 and 1032. Outputs of multipliers 1026 and 1028 are then provided to registers 1034 and 1036, which are each coupled back to state RAM 1002. Between registers 1034 and 1036, write cache 1035 and state RAM 1002, which operates to provide data to registers 1034 and 1036.

Referring to ROM coefficients 1030 and 1032, an embodiment provides for including 512 entries in each of ROM 1030 and 1032. Using two ROMs allows two multiplies to occur in a single clock period. Although for much of FFT and IFFT processing ROMs 1030 and 1032 require 4096 entries, symmetry between the ROMs is applied to prevent redundant entries and reduce the number. According to an embodiment, for a 8192 point transform, such as for fold stages of processing, and the like, one entry from each of ROMs 1030 and 1032 are retrieved and interpolated to produce interpolated entries to enable the 8192 point transform.

As a result of the hardware described with reference to FIG. 10, the b6 partial product, for example, must be saved in a register for five clocks. In an embodiment, a control is provided that addresses the need to expand on a four clock operation. A simple toggle register is used to toggle the addressing and cause the b4 and b1 values to alternate between registers 3 and 5 and the b4 and b6 values to alternate between registers 4 and 6. The operation of the toggle bit is controlled by instructions.

The radix-8 butterfly hardware reads two complex samples and writes two complex samples per clock. The four samples accessed on each cycle are configured to reside in separate memory banks to avoid needing dual port RAMs. The memory organization is further complicated by the data transfers between external blocks and state RAM. These transfers operate on sequential pairs of samples. To allow these transfers to occur at full speed, the even and odd samples are stored in separate memory banks via discarding bit 1 of a bit of a bank number calculated via an algorithm, such as the FAST algorithm. Bit 1 of the original address is used as part of the bank address. The IFFT pre-processing and FFT post-processing stages also put requirements on the memory organization. The following table summarizes the memory bank requirements. The table shows the indices of samples that must be stored in different memory banks for each stage of processing. Each cell in a row represents a separate memory bank. The cells within a column do not necessarily need to belong to the same memory bank. The tables assume application of the Sande-Tukey or decimation in frequency method.

TABLE 5

Memory Bank Requirements

Separate Memory Banks

| | | | | |
|---|---|---|---|---|
| FFT Stage 0 N=0 to 511 | N N+2 (512) | N+4 (512) N+6 (512) | N+1 (512) N+3 (512) | N+5 (512) N+7 (512) |
| FFT Stage 1 N=0 to 63 | N N+2 (64) | N+4 (64) N+6 (64) | N+1 (64) N+3 (64) | N+5 (64) N+7 (64) |
| FFT Stage 2 N=0 to 7 | N N+2 (8) | N+4 (8) N+6 (8) | N+1 (8) N+3 (8) | N+5 (8) N+7 (8) |
| FFT Stage 3 N=N+8, N<4096 | N N+2 | N+4 N+6 | N+1 N+3 | N+5 N+7 |
| Pre/Post process N=1 to 4095 | N | 4096−N | | |
| Data transfers | N | N+1 | | |

For example, when N=0 the table shows that the samples in the following groups must reside in different memory banks: (0, 2048, 512, 2560), (0, 256, 64, 320), (0, 32, 8, 40), (0, 4, 1, 5), (2, 4094), and (0, 1).

Figure 11:
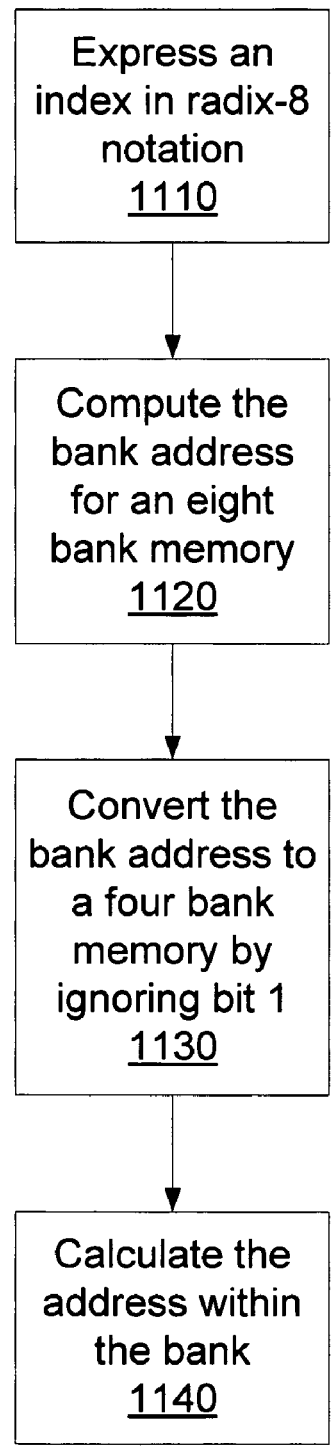
FIG. 11 is a flow diagram illustrating a method for addressing memory banks in an FFT and IFFT component in accordance with an embodiment of the present invention.

According to an embodiment, a method for addressing the memory banks is shown in FIG. 11. More particularly, FIG. 11 provides a method for the addressing for a radix-8 FFT using eight memory banks. Block 1110 provides for expressing an index in radix-8 notation: I=I(3)*512+I(2)*64+I(1)*8+I(0). Block 1120 provides for computing the bank address for an eight bank memory: B=(I(3)+I(2)+I(1)+I(0)) modulo 8. Block 1130 provides for converting the bank address to a four bank memory by ignoring bit 1: B=(b2 b1 b0), B4=(b2 b0), and saving bit 1 for use as bit 0 of an A address. Block

1140 provides for calculating the address within the bank: A=I/4. In one embodiment, bits are concatenated as follows: A={I[11:3],I[1]}. Thus, A=((Integer(I/8))*2)+((Integer(I/2)) mod 2).

Referring now to FIGS. 12A and 12B, table 1200 illustrates partial results during different stages of FFT and IFFT processing, RAM read access entries 1202, Stage 1 calculations 1204, Stage 1 storage 1206, Stage 2 calculations 1208, Stage 2 storage 1210, Stage 3 Calculations 1212, and RAM write access 1214. As table 1200 illustrates, bank reduction is effective because samples separated by 2, 2*8, 2*64, and 2*512 can reside in the same bank. All calculations are power of two and thus involve simple bit manipulation independent of math blocks.

During butterfly and fold processing, a same memory bank may need multiple accesses during one cycle. When this occurs for the two read operations, the pipeline is stalled by one clock so that both values can be accessed. However, an addressing conflict is uncommon and performance reduction is negligible.

A more common conflict occurs when read and write or multiple writes access the same memory bank. To avoid a large performance penalty, an embodiment is directed to providing a write cache. The cache can store up to eight pending memory writes. During normal processing, the cache controller determines which memory banks are available for writing by verifying that the same banks are not being read. If the data coming from the pipeline is destined for an available bank then it is written directly to memory. If not, then it is written to the cache. During the same cycle the cache controller will write any data that is in the cache that is destined for an available memory bank. On occasion the cache will become full. In that case the controller stops the pipeline and flushes the entire cache.

Each memory location holds a complex sample using 32 bits of data. The sample can be in a fixed point format with 16 bits for the real value and 16 bits for the imaginary or one of two floating point formats. The first floating point representation (FP2) uses two bits for the exponent and 14 bits for the mantissa for both the real and imaginary values. The second format (FP4) uses 14 bits for each mantissa and a shared four bit exponent.

The data pipeline performs all floating point operations using a four bit exponent and a mantissa that grows in size from the front of the pipeline to the back. Data converters at the front and back of the pipeline allow the data to be read and written in any of the supported formats. Normally, the input transfers are fixed point but are converted to FP2 before being written to memory and the output transfers are also fixed point. All other operations required for FFT/IFFT processing use the FP4 format for storing temporary values.

The radix-8 pipeline is largely a fixed structure. However, some amount of programmability is required to allow the structure to be used for radix-8 butterflies, IFFT pre-processing, FFT post-processing, and state memory transfers. Rather than using hardcoded execution modes, a set of microcode registers are provided that control the pipeline dataflow. When combined with a programmable address generation unit this strategy allows the FFT algorithm to be modified or pipeline to be used for non-FFT calculations. Adding this capability does not significantly increase the size of the pipeline but makes the FFT coprocessor more flexible.

The tables provided below describe the datapath microde registers.

TABLE 6

| Bit(s) | Name | R/W | Reset/power-on | Description |
|---|---|---|---|---|
| 23:21 | Reserved | R/W | 3'h0 | Reserved |
| 20:19 | Stage C - Complement Opcode | R/W | 2'h0 | Opcode for the stage C complementors.<br>2'h0 = NOP<br>2'h1 = Complement adder output<br>2'h2 = Complement subtractor output<br>3'h3 = Auto complement based on transform, adder for FFT, subtractor for IFFT |
| 18 | Stage C Fold | R/W | 1'h0 | Setup stage C for fold processing. The order of the adders and subtractors are swapped. |
| 17 | Stage C Swap | R/W | 1'h0 | When set the output of the stage C adder and subtractor are swapped before being used by the next math block. |
| 16:14 | Stage C Input | R/W | 3'h0 | Selects two of the eight stage B registers into the front of the stage C pipeline. The selection is encoded into three bits to save microcode space. The three bits determine both read addresses as follows:<br>Code  Normal Addresses  Munged Addresses<br>3'h0  0, 4  0, 2<br>3'h1  1, 5  1, 3<br>3'h2  2, 6  4, 6<br>3'h3  3, 7  5, 7<br>3'h4  0, 1  0, 1<br>3'h5  2, 3  2, 3<br>3'h6  4, 5  4, 5<br>3'h7  6, 7  6, 7 |

TABLE 6-continued

| Bit(s) | Name | R/W | Reset/power-on | Description |
|---|---|---|---|---|
| 13:12 | Stage C Opcode | R/W | 2'h0 | Opcode for stage C adder/subtractor<br>2'h0 = NOP<br>2'h1 = Add operand 0 to 1 and subtract operand 1 from 0<br>2'h2 = Add operand 0 to 1 and subtract operand 0 from 1<br>3'h3 = Same as 2'h1 but the (0, j) multiplier is also applied to operand 1 before add/subtract. |
| 11 | Stage B Swap | R/W | 1'h0 | When set the output of the adder and subtractor are swapped before being written into the stage B registers. |
| 10 | Stage B Munge | R/W | 1'h0 | Affects the input and output addressing of the stage B registers. The munge bit toggles a state bit that controls the addressing. This is needed to allow some stage B values to be retained for more than four clocks using only four microwords. |
| 9:8 | Stage B Output | R/W | 2'h0 | Selects two of the eight stage B registers for writing by the stage B pipeline.<br>Code   Normal Addresses   Munged Addresses<br>3'h0    0, 1                            0, 1<br>3'h1    2, 3                            4, 5<br>3'h2    4, 5                            2, 3<br>3'h3    6, 7                            7, 6 |
| 7:6 | Stage B Input | R/W | 2'h0 | Selects two of the four stage A registers for input into the stage B pipeline.<br>Code   Addresses<br>2'h0    0, 1<br>2'h1    2, 3<br>2'h2    0, 2<br>2'h3    1, 3 |
| 5:4 | Stage B Opcode | R/W | 2'h0 | Opcode for stage B adder/subtractor<br>2'h0 = NOP<br>2'h1 = Add operand 0 to 1 and subtract operand 1 from 0<br>2'h2 = Add operand 0 to 1 and subtract operand 0 from 1<br>3'h3 = Same as 2'h1 but the (0, j) multiplier is also applied to operand 1 before add/subtract. |
| 3:2 | Stage A Output | R/W | 2'h0 | Selects two of the four stage A registers for writing by the stage A pipeline.<br>Code   Addresses<br>2'h0    0, 1<br>2'h1    2, 3<br>2'h2    0, 2<br>2'h3    1, 3 |
| 1:0 | Stage A Opcode | R/W | 2'h0 | Opcode for stage A adder/subtractor<br>2'h0 = NOP<br>2'h1 = Add operand 0 to 1 and subtract operand 1 from 0<br>2'h2 = Add operand 0 to 1 and subtract operand 0 from 1<br>3'h3 = Same as 2'h1 but the $\pi/4$ multiplier is also applied to operand 1 after subtraction. |

The register shown in Table 5 define a set of eight datapath microwords that can be used by the sequencer. Each microword defines the multiplexing and other controls needed by the datapath logic for one clock. These microwords are decoded into the raw controls and stored in registers before being used by butterfly 900 to prevent the decoding from being in the critical paths. Each sequencer stage, such as butterfly, fold, and the like, can use up to four microwords in one embodiment.

Table 7, below illustrates frequency map registers:

TABLE 7

| Bit (s) | Name | R/W | Reset/ power-on | Description |
|---|---|---|---|---|
| 23:12 | End | R/W | 12'h0 | Ending frequency bin for a FFT/IFFT passband |
| 11:0 | Start | R/W | 12'h0 | Starting frequency bin for a FFT/IFFT passband |

The frequency map registers define the passbands for the FFT and IFFT. The first four registers (0xFFF808-0xFFF80B) are used for the FFT and the last four are used for the IFFT. The available frequency map registers are divided evenly between the channels. For a single channel configuration there are four passbands available in each direction. For two channels there are two passbands per direction per channel and for four channels there is only one passband per direction per channel.

The frequency map is used during addressing calculations for input/output frequency domain data transfers and scaling. To save processing cycles the frequency domain transfers only include the frequency bins that are in the passbands. These registers are used to map those samples into the correct place in state memory. They are also used to select the correct scaling values since the scale factors are packed in memory.

TABLE 8

Sequencer Microword Registers

| Bit (s) | Name | R/W | Reset/ power-on | Description |
|---|---|---|---|---|
| 23 | Multiplier Source | R/W | 1'h0 | Determines the source for the datapath stage C multipliers during scaling operations: 0 = scaling memory, 1 = Scaling registers |
| 22 | Fold | R/W | 1'h0 | Setup the datapath pipeline for Fold processing. |
| 21:20 | Input Format | R/W | 2'h0 | Number format at the input of the datapath pipeline (from memory or point-to-point). 2'h0 = Force zeros as input 2'h1 = Fixed - 16 bit signed 2's complement 2'h2 = FP2 - Signed floating point, 2 bit exponent, 14 bit mantissa: <real exp, real mant><imag exp, imag mant> 2'h3 = FP4 - Signed floating point, 4 bit shared exponent, 14 bit mantissa: <exp[3:2], real mant><exp[1:0], imag mant> |
| 19:18 | Output Format | R/W | 2'h0 | Number format at the output of the datapath pipeline (from memory or P2P). 2'h0 = Force zeros as output 2'h1 = Fixed - 16 bit signed 2's complement 2'h2 = FP2 - Signed floating point, 2 bit exponent, 14 bit mantissa: <real exp, real mant><imag exp, imag mant> 2'h3 = FP4 - Signed floating point, 4 bit shared exponent, 14 bit mantissa: <exp[3:2], real mant><exp[1:0], imag mant> |
| 17 | Data source | R/W | 1'h0 | Input source for the data pipeline: 0 = Memory, 1 = P2P |
| 16 | Data destination | R/W | 1'h0 | Output destination for the data pipeline: 0 = Memory, 1 = P2P |
| 15:12 | Pipeline delay | R/W | 4'h0 | Number of clock delays from the input of the pipeline to the output. This value can be used to adjust the pipeline timing for different configurations. |
| 11:9 | DP Uword 3 | R/W | 3'h0 | Datapath microword for cycle 3 - Selects from one of the 8 microcode registers. |
| 8:6 | DP Uword 3 | R/W | 3'h0 | Datapath microword for cycle 2 - Selects from one of the 8 microcode registers. |
| 5:3 | DP Uword 1 | R/W | 3'h0 | Datapath microword for cycle 1 - Selects from one of the 8 microcode registers. |
| 2:0 | DP Uword 0 | R/W | 3'h0 | Datapath microword for cycle 0 - Selects from one of the 8 microcode registers. |

IFFT Output Gains—4 Registers

TABLE 9

IFFT Output Gain Registers

| Bit (s) | Name | R/W | Reset/ power-on | Description |
|---|---|---|---|---|
| 23:12 | Mantissa | R/W | 12'h0 | Unsigned scale factor mantissa |
| 11:8 | Exp | R/W | 4'h0 | Scale factor exponent |
| 7:0 | Reserved | R/W | 8'h0 | Reserved |

There is one gain registers provided per channel. The value is multiplied by all time domain samples of an IFFT output as they are transferred to the TX FIFO.

Address Generation Microcode—12 Registers

TABLE 10

Data Transfer Control Register

| Bit (s) | Name | R/W | Reset/ power-on | Description |
|---|---|---|---|---|
| 23:19 | Reserved | R/W | 5'h0 | Reserved |
| 18 | Digit Reverse | R/W | 1'h0 | Apply digit reversal to all address calculations. For radix-4 the digits are 2 bits and for radix-8 they are 3 bits. |

TABLE 10-continued

Data Transfer Control Register

| Bit(s) | Name | R/W | Reset/ power-on | Description |
|---|---|---|---|---|
| 17:16 | Multiplier Mode | R/W | 2'h0 | Addressing mode for the datapath multipliers: 2'h0 = NOP, multiply by 1 2'h1 = Twiddle factor addresses for butterflies 2'h2 = Scale factor addresses 3'h3 = Twiddle factor addresses for fold stages |
| 15:12 | AGU Mode | R/W | 4'h0 | Address generation unit mode - Determines the type of memory addresses that are generated by the AGU. The AGU generates two read and two write addresses for each clock. 4'h0 = Butterfly stage 0 4'h1 = Butterfly stage 1 4'h2 = Butterfly stage 2 4'h3 = Butterfly stage 3 4'h4 = Butterfly stage 4 4'h5 = Butterfly stage 5 4'h6 = Butterfly stage 6 4'h7 = Butterfly stage 7 4'h8 = Increment 4'h9 = Fold – Start at (1, FFT_SIZE–1) and increment by (1, –1) 4'ha = Frequency Map - Increment through addresses using the start and end values of the frequency map. When an end value is reached, jump to the next map. 4'hb = Modulo - Start at the starting address in the modulo register and wrap to zero when the end address is reached. 4'hc = Fill - Increment through FFT_SIZE/4 addresses and apply each address to all four state RAM banks. |
| 11:0 | Clock count | R/W | 12'h0 | Number of cycles to run the sequencer and AGU microwords. |

IFFT Output Modulo—4 Registers

TABLE 11

Modulo Registers

| Bit(s) | Name | R/W | Reset/ power-on | Description |
|---|---|---|---|---|
| 23:12 | End | R/W | 12'h0 | Modulo address for the IFFT output transfer. The memory address wraps to 0 after this limit is reached. |
| 11:0 | Start | R/W | 12'h0 | Starting memory address for the IFFT output transfer |

The IFFT modulo registers are provided to facilitate cyclic extension insertion. The output transfer to the TX FIFO can be setup to repeat both the beginning and end of the symbol. For example, if the start address is set to FFT_SIZE–128, the end address to FFT_SIZE, and the clock count is set to FFT_SIZE+256 then the output transfer will be <last 128 samples> <full symbol> <first 128 samples>. That will allow the TX FIFO to build the cyclic extension without needing random access to the FIFO memory.

Referring back to Table 8, an embodiment is directed to method for efficiently formatting the input and output data for floating point values. More particularly, for purposes of comparison, the following table represents an exemplary thirty-two (32) bits of computer memory for storing a complex number according to the prior art. It should be noted that there are many ways to implement such computer memory such as, but not limited to, RAM, latch memory and registers.

TABLE 12

| Bit(s) | Name | R/W | Reset/ power-on | Description |
|---|---|---|---|---|
| 31 | Sign | R/W | 1'h0 | Indicates whether the real component of the represented imaginary number is positive or negative |
| 30:20 | Significand | R/W | 11'h0 | Indicates an explicit or implicit leading bit to the left of the real component of the represented number's implied binary point and a fraction field to the right of the implied binary point |
| 19:16 | Exponent | R/W | 4'h0 | Indicates the power to which the base 2 number must be raised to generate the real component of the represented number |
| 15 | Sign | R/W | 1'h0 | Indicates whether the imaginary component of the represented imaginary number is positive or negative |
| 14:4 | Significand | R/W | 11'h0 | Indicates an explicit or implicit leading bit to the left of the imaginary component of the represented number's implied binary point and a fraction field to the right of the implied binary point |
| 3:0 | Exponent | R/W | 4'h0 | Indicates the power to which the base 2 number must be raised to generate the imaginary component of the represented number |

The table above includes bits representing the sign (31), i.e. positive or negative, and the significand (30:20) of the mantissa of the real component of the represented complex number. The exponent (19:16) of the real component of the represented complex number is also included. It should be noted that the exponent (19:16) does not include a bit for the sign, although in another example it may.

The table above includes bits representing the sign (15), i.e. positive or negative, and the significand (14:4) of the mantissa of the imaginary component of the represented complex number. The exponent (3:0) of the imaginary component of the represented complex number is also included. As with the real component, it should be noted that the exponent (3:0) does not include a bit for the sign, although in another example it may.

The table above represents the prior art in that the real and imaginary components of the represented complex number each have separate and distinct bits corresponding to their respective exponents.

The following table 12 represents an exemplary thirty-two (32) bits of memory for storing a complex number according to the claimed subject matter.

TABLE 13

| Bit(s) | Name | R/W | Reset/power-on | Description |
|---|---|---|---|---|
| 31 | Sign | R/W | 1'h0 | Indicates whether the real component of the imaginary number is positive or negative |
| 30:18 | Significand | R/W | 13'h0 | Indicates an explicit or implicit leading bit to the left of the real component of the represented number's implied binary point and a fraction field to the right of the implied binary point |
| 17:14 | Exponent | R/W | 4'h0 | Indicates one component of the power to which the base 2 number must be raised to generate both the real and imaginary components of the represented number |
| 13 | Sign | R/W | 1'h0 | Indicates whether the imaginary component of the imaginary number is positive or negative |
| 12:0 | Significand | R/W | 13'h0 | Indicates an explicit or implicit leading bit to the left of the imaginary component of the represented number's implied binary point and a fraction field to the right of the implied binary point |

Like table 12 above that illustrates the prior art, the table directly above includes bits for the sign (31) and significand (30:18) of the mantissa of the real component of the represented complex number and sign (13) and significand (12:0) of the mantissa of the imaginary component of the represented complex number. Unlike table 12, table 13 includes only one set of bits (17:14) for storing an exponent. The bits (17:14) represent the exponent of both the real and imaginary components of the represented complex number. It should be noted that as a result of sharing an exponent, an additional two (2) bits are able to be allocated for the storage of the significands of the real and imaginary components. It should also be noted that, although the exponent described above does not include a bit for the sign, i.e. positive or negative, in another embodiment it could.

Figure 13:
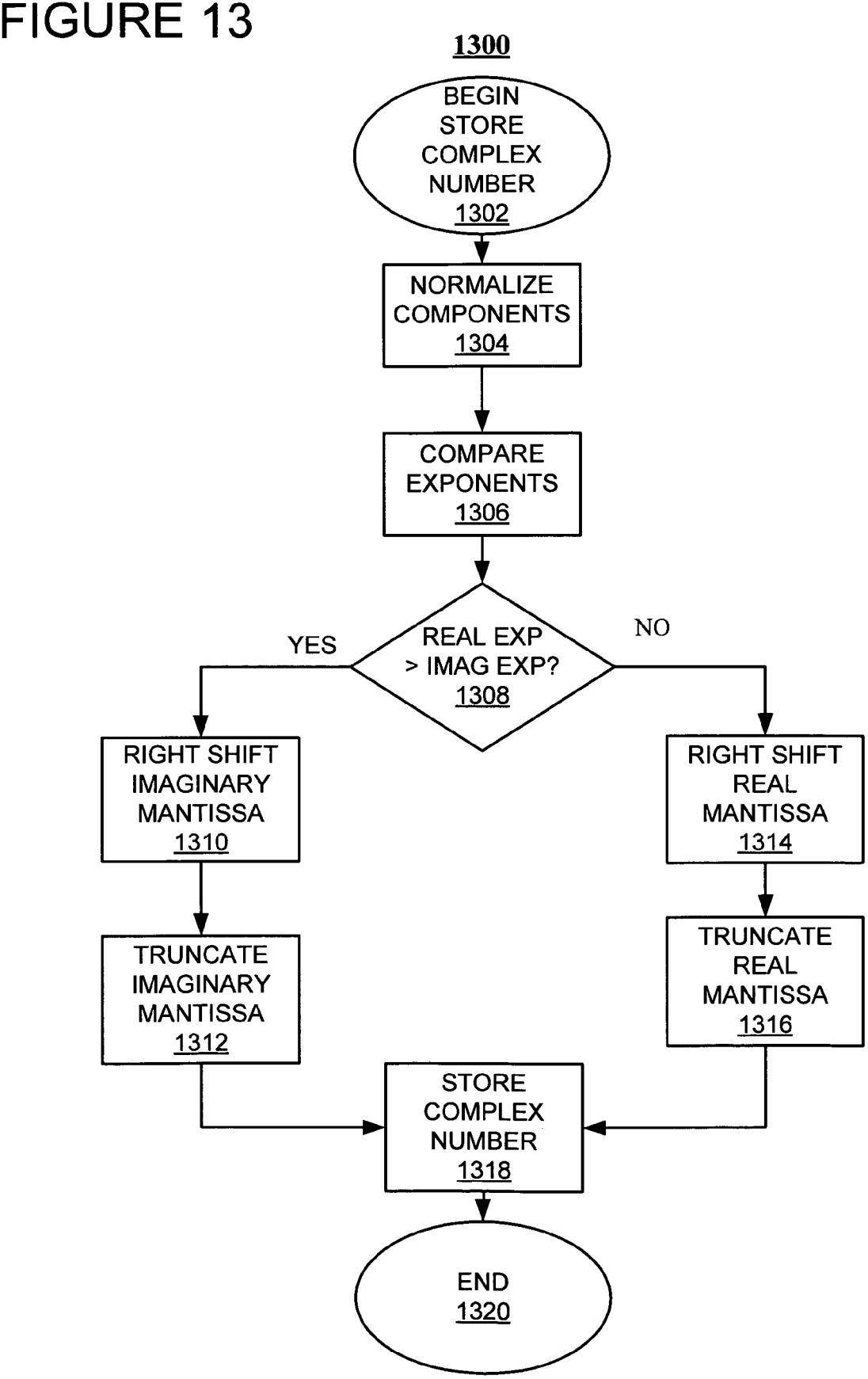
FIG. 13 is a flowchart of a process for storing a complex number in a manner consistent with the claimed subject matter.

A process 1300, described below in conjunction with FIG. 13, illustrates one exemplary method for storing a complex number in such a 32-bit memory location.

The following table 14 represents an alternative embodiment of an exemplary thirty-two (32) bits of memory for storing a complex number according to the claimed subject matter.

TABLE 14

| Bit(s) | Name | R/W | Reset/power-on | Description |
|---|---|---|---|---|
| 31 | Sign | R/W | 1'h0 | Indicates whether the real component of the represented imaginary number is positive or negative |
| 30:19 | Significand | R/W | 12'h0 | Indicates an explicit or implicit leading bit to the left of the real component of the represented number's implied binary point and a fraction field to the right of the implied binary point |
| 18:17 | Exponent | R/W | 2'h0 | Indicates a component of the power to which the base 2 number must be raised to generate the real component of the represented number |
| 16 | Sign | R/W | 1'h0 | Indicates whether the imaginary component of the represented imaginary number is positive or negative |
| 15:4 | Significand | R/W | 12'h0 | Indicates an explicit or implicit leading bit to the left of the imaginary component of the represented number's implied binary point and a fraction field to the right of the implied binary point |
| 3:2 | Exponent | R/W | 2'h0 | Indicates a component of the power to which the base 2 number must be raised to generate the imaginary component of the represented number |
| 1:0 | Multiplier | R/W | 2'h0 | Indicates a second component of the power to which the base 2 number must be raised to generate both the real and imaginary components of the represented number |

Like table 12 above that illustrates the prior art with respect to the claimed subject matter, table 14 includes bits for the sign (31) and significand (30:19) of the mantissa and the corresponding exponent (18:17) of the real component of the represented complex number and sign (16) and significand (15:4) of the mantissa and the corresponding exponent (3:2) of the imaginary component of the represented complex number.

Unlike table 12 that illustrates the memory location corresponding to the prior art, the table 14 also includes a set of bits (1:0) for storing an exponent "multiplier". The exponent multiplier is combined with both the real exponent bits (18:17) and the imaginary exponent bits (3:2) to arrive at the correct exponents for each component.

It should be noted that as a result of sharing an exponent multiplier, an additional one (1) bit is able to be allocated for the storage of the significands of the real and imaginary components. In effect, the multiplier enables the real and imaginary components to have a larger difference in magnitude before any rounding must occur, as described below in conjunction with FIG. 13. It should also be noted that, although neither of the non-shared exponent bits described above do not include a bit for the sign, i.e. positive or negative, in another embodiment they could.

Referring now to FIG. 13, a flow diagram illustrates process 1300 for storing a complex number in a manner consistent with the claimed subject matter. Process 1300 starts in a "Begin Store Complex Number" block 1302 and control proceeds immediately to a "Normalize Components" block 1304. During block 1304, process 1300 puts both the real and imaginary components of a subject complex number into a normalized form, i.e., each mantissa is adjusted to fall within predefined boundaries and the corresponding exponents are adjusted accordingly so that the each of the original component values are accurately reflected in the corresponding mantissa/exponent pair.

Process 1300 then proceeds to a "Compare Exponents" block 1306 during which the normalized exponents of the real and imaginary components are compared. In decision block 1308, if the real exponent is larger than the imaginary exponent, then control proceeds to a "Right Shift Imaginary Mantissa" block 1310 during which the significand of the mantissa of the imaginary component of the represented complex number is right shifted by a value equal to the difference of the exponents. Process 1300 then proceeds to a "Truncate Imaginary Mantissa" block 1312 during which the right shifted significand is either truncated or rounded, depending upon the particular implementation, to a size that equals the size of the bits allocated for its storage.

Note that rounding can introduce a problem case where adding a 1 to the least significant bit would cause an increase in the exponent after re-normalization. However, since we only round the right shifted mantissa, this cannot occur. During Normalize Components block 1304, there could be rounding as well, especially if the pipeline width is wider than the final memory width.

If, in block 1308, the real exponent is less than or equal the imaginary exponent, then control proceeds to a "Right Shift Real Mantissa" block 1314 during which the significand of the mantissa of the real component of the represented complex number is right shifted by a value equal to the difference of the exponents. It should be noted that if the difference is equal to '0', then significand of the mantissa of the real component of the represented complex number does not need to be right shifted. Process 1300 then proceeds to a "Truncate Real Mantissa" block 1316 during which the right shifted significand is either truncated or rounded, depending upon the particular implementation, to a size that equals the size of the bits allocated for its storage.

Control proceeds from both blocks 1312 and 1316 to a "Store Complex Number" block 1318 during which the real and imaginary mantissa are stored in the appropriate place in memory and the exponent of the non-shifted component is stored in the shared exponent memory location. Control then proceeds to an "End Store Complex Number" block 1320 in which process 1300 is complete.

Process 1300 describes a method of storing a complex number when the allocated memory includes only a single shared set of bits for storing the exponents of the real and imaginary components of the represented complex number. As described above, another embodiment of the claimed subject matter includes a first and second set of bits for the exponents of the real and imaginary components and a third set of bits that represent a multiplier exponent. In this embodiment, Compare Exponents block 1306 determines whether or not the exponents of the real and imaginary components are close enough in value such that the multiplier can account for the difference. If not, a right shift is executed on the appropriate mantissa such that the multiplier is able to account for the difference. Then, in block 1318, the exponents of the real and imaginary components are each factored into two components, one representing the shared multiplier and a second and third corresponding to values such that the corresponding exponent can be recalculated. The three values are then stored in the appropriate memory locations.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing embodiments of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A Fourier transform architecture comprising:
 a programmable butterfly component configured to perform a plurality of radix butterfly calculations; a bank memory coupled to the butterfly component, the bank memory configured to separate even from odd sample data;
 a programmable address generation unit (AGU) coupled to the bank memory to enable the architecture to perform calculations including of Fourier-based and non-Fourier based algorithms; and
 one or more computer memories configured to store complex numbers, each computer memory configured to hold: a plurality of bits representing a signed mantissa of a real component of a represented complex number; a plurality of bits representing a signed mantissa of an imaginary component of the represented complex number; and a plurality of bits representing a first exponent corresponding to a base number associated with the complex number, the first exponent configured to correspond to both the real component and the imaginary component of the complex number.

2. The Fourier transform architecture of claim 1, wherein the memory further comprises:

a location configured to store a plurality of bits representing a second exponent corresponding to the real component of the represented complex number, wherein a complete exponent corresponding to the real component is calculated as a function of the first exponent and the second exponent; and a location configured to store a plurality of bits representing a third exponent corresponding to the imaginary component of the represented complex number, wherein a complete exponent corresponding to the imaginary component is calculated as a function of the first exponent and the third exponent.

3. The Fourier transform architecture of claim 1, wherein the base number is equal to a value of two (2).

4. The Fourier transform architecture of claim 1, wherein a total number of bits in the memory is thirty-two (32) bits.

5. The Fourier transform architecture of claim 1, wherein the number of bits in the plurality of bits representing the first exponent is equal to four (4) bits.

6. The Fourier transform architecture of claim 1, wherein a total number of bits in the memory is sixty-four (64) bits.

* * * * *